United States Patent
Castano et al.

(10) Patent No.: US 10,701,457 B2
(45) Date of Patent: Jun. 30, 2020

(54) SYSTEM AND METHOD FOR GOAL-ORIENTED GENERATION OF ADVERTISING SPOT SETS

(71) Applicant: Active Media Services, Inc., Pearl River, NY (US)

(72) Inventors: Melissa A. Castano, Nanuet, NY (US); Martin Lhotak, Nanuet, NY (US)

(73) Assignee: Active Media Services, Inc., Pearl River, NY (US)

( * ) Notice: Subject to any disclaimer, the term of this patent is extended or adjusted under 35 U.S.C. 154(b) by 0 days.

(21) Appl. No.: 15/643,102

(22) Filed: Jul. 6, 2017

(65) Prior Publication Data

US 2018/0014086 A1   Jan. 11, 2018

Related U.S. Application Data

(60) Provisional application No. 62/360,010, filed on Jul. 8, 2016.

(51) Int. Cl.
| | | |
|---|---|---|
| *H04N 21/81* | (2011.01) | |
| *H04N 21/262* | (2011.01) | |
| *H04N 21/258* | (2011.01) | |
| *G06Q 30/02* | (2012.01) | |

(52) U.S. Cl.
CPC ....... *H04N 21/812* (2013.01); *G06Q 30/0264* (2013.01); *H04N 21/25883* (2013.01); *H04N 21/25841* (2013.01); *H04N 21/26241* (2013.01)

(58) Field of Classification Search
CPC ........... H04N 21/812; H04N 21/26241; H04N 21/25841; H04N 21/25883
See application file for complete search history.

(56) References Cited

U.S. PATENT DOCUMENTS

| | | |
|---|---|---|
| 6,985,882 B1 | 1/2006 | Del Sesto |
| 8,069,097 B2 | 11/2011 | Patrick et al. |
| 8,117,067 B2 | 2/2012 | Ketchum |
| 8,423,407 B2 | 4/2013 | Schepers et al. |

(Continued)

FOREIGN PATENT DOCUMENTS

WO   2001/07985 A2   2/2001

OTHER PUBLICATIONS

Avila-George et al., New Bounds for Ternary Covering Arrays Using a Parallel Simulated Annealing, Jul. 7, 2012, retrieved from the Internet "https://riunet.upv.es/bitstream/handle/10251/28323/897027.pdf?sequence=1", pp. 20 (Year: 2012).*

(Continued)

*Primary Examiner* — Pinkal R Chokshi

(74) *Attorney, Agent, or Firm* — Barclay Damon LLP

(57) ABSTRACT

A system and method are disclosed that, in an embodiment, are related to goal-oriented generation of advertising spot sets. The system and method each involve: receiving spot inventory data associated with a plurality of TV stations; receiving a rule variable associated with an advertising rule; receiving a goal variable associated with a goal; applying the advertising rule to select a plurality of spots that are eligible to form one or more spot sets; forming or generating at least one of the spot sets depending, at least in part, on a proximity to the goal; and generating an output associated with the generated spot set.

25 Claims, 18 Drawing Sheets

(56) References Cited

U.S. PATENT DOCUMENTS

| | | | |
|---|---|---|---|
| 8,615,436 | B2 | 12/2013 | Stukenborg et al. |
| 8,701,136 | B2 | 4/2014 | Rathburn et al. |
| 8,782,683 | B2 | 7/2014 | Balakrishnan et al. |
| 9,104,669 | B1* | 8/2015 | Des Jardins ............ G06F 16/40 |
| 9,118,963 | B2 | 8/2015 | Balakrishnan et al. |
| 9,147,198 | B2 | 9/2015 | Emans et al. |
| 9,280,785 | B1 | 3/2016 | Jain |
| 9,344,750 | B2 | 5/2016 | Popescu et al. |
| 2002/0013757 | A1 | 1/2002 | Bykowsky et al. |
| 2006/0287915 | A1 | 12/2006 | Boulet et al. |
| 2007/0073583 | A1 | 3/2007 | Grouf et al. |
| 2007/0083885 | A1 | 4/2007 | Harding |
| 2007/0143186 | A1 | 6/2007 | Apple et al. |
| 2007/0199017 | A1 | 8/2007 | Cozen et al. |
| 2007/0288350 | A1* | 12/2007 | Bykowsky ......... G06Q 30/0273 705/37 |
| 2008/0022301 | A1* | 1/2008 | Aloizos ................ G06Q 30/02 725/34 |
| 2008/0189734 | A1 | 8/2008 | Schepers et al. |
| 2009/0006145 | A1 | 1/2009 | Duggal et al. |
| 2009/0037267 | A1 | 2/2009 | Duggal et al. |
| 2009/0150930 | A1* | 6/2009 | Sherwin ............... G11B 27/031 725/35 |
| 2009/0248478 | A1 | 10/2009 | Duggal et al. |
| 2009/0254420 | A1 | 10/2009 | Curd et al. |
| 2010/0138290 | A1 | 6/2010 | Zschocke et al. |
| 2011/0040634 | A1* | 2/2011 | Landsberry ........... G06Q 30/02 705/14.69 |
| 2011/0087509 | A1 | 4/2011 | Schepers et al. |
| 2011/0161162 | A1* | 6/2011 | Ketchum ............... G06Q 30/02 705/14.43 |
| 2012/0260281 | A1* | 10/2012 | Wolinsky ........... H04N 21/2547 725/36 |
| 2014/0012684 | A1 | 1/2014 | Bykowsky |
| 2014/0114773 | A1 | 4/2014 | Stukenborg et al. |
| 2014/0297400 | A1 | 10/2014 | Sandholm |
| 2015/0120464 | A1 | 4/2015 | Ziegler et al. |
| 2015/0269632 | A1 | 9/2015 | Ledwich et al. |
| 2015/0339702 | A1 | 11/2015 | Lin et al. |
| 2016/0117719 | A1 | 4/2016 | Hood et al. |
| 2017/0295411 | A1* | 10/2017 | Sandholm ............ H04N 21/812 |

OTHER PUBLICATIONS

Seshadri et al.; "Scheduling Spots on Television"; Jun. 17, 2015; retrieved from the internet <http://eprints.exchange.isb.edu/436/1/spotsscheduling_06.17.15.pdf>; 44 pages.

Avila-George et al.; "New Bounds for Ternary Covering Arrays Using a Parallel Simulated Annealing"; In: Mathematical Problems in Engineering; Jul. 7, 2012; retrieved from the internet <https://riunet.upv.es/bitstream/handle/10251/28323/897027.pdf?sequence=1>; 20 pages.

PCT/US2017/041025; International Filing Date Jul. 7, 2017; International Search Report and Written Opinion; dated Sep. 15, 2017; 14 pages.

* cited by examiner

| GOAL DATA CATEGORIES | EXAMPLE GOALS |
|---|---|
| POPULATION | • 50% OF UNITED STATES POPULATION OF TV HOUSEHOLDS.<br>• 77% OF UNITED STATES POPULATION OF TV HOUSEHOLDS.<br>• X% OF UNITED STATES POPULATION OF TV HOUSEHOLDS. |
| COST | • $4.00 CPM.<br>• <$6.00 CPM.<br>• $6.75 CPM TO $8.25 CPM. |
| TERRITORIAL SPOT DISTRIBUTION | • RATIO:<br>   ○ 1/3<br>   ○ 1/4<br>   ○ 1/X<br>• AVERAGE PER MARKET:<br>   • AVERAGE (E.G., 80 SPOTS)<br>   • AVERAGE (E.G., 80 SPOTS) + OR - 10 SPOTS<br>   • AVERAGE (E.G., 80 SPOTS) + OR - X SPOTS |
| SPOT FREQUENCY | • MONDAY:<br>   ○ = OR < 1 SPOT<br>   ○ = OR < 2 SPOTS<br>   ○ = OR < X SPOTS<br>• MONDAY - FRIDAY:<br>   ○ = OR < 8 SPOT<br>   ○ 10 TO 15 SPOTS<br>   ○ = OR < X SPOTS |
| DEMOGRAPHIC | • DEMO A: AGE RANGE 20-30 AND FEMALE GENDER<br>• DEMO B: AGE RANGE 20-30 AND MALE GENDER<br>• DEMO C: AGE RANGE X-Y AND GENDER Z |
| TERRITORIAL IMPRESSION GOAL | • 5,000 IMPRESSIONS PER WEEK<br>• 8,000 TO 10,000 IMPRESSIONS PER WEEK<br>• X IMPRESSIONS PER WEEK |

FIG. 3

MARKET RANGE

Upload Market Range file

Choose File | No file chosen

[Upload] 50, 52

| Rank | Designated Market Area (DMA) | % of US | Market Code | Market Name |
|---|---|---|---|---|
| 1 | New York | 6.503 | NY NY | NEW YORK, NY |
| 2 | Los Angeles | 4.845 | LA CA | LOS ANGELES, CA |
| 3 | Chicago | 3.067 | CHI IL | CHICAGO, IL |
| 4 | Philadelphia | 2.575 | PHL PA | PHILADELPHIA, PA |
| 5 | Dallas-Ft. Worth | 2.335 | DF TX | DALLAS-FT. WORTH, TX |
| 6 | San Francisco-Oak-San Jose | 2.193 | SF CA | SAN FRANCISCO-OAK-SAN JOSE, CA |
| 7 | Washington, DC (Hagrstwn) | 2.156 | WAS DC | WASHINGTON, DC (HAGRSTWN) |
| 8 | Boston (Manchester) | 2.128 | BOS MA | BOSTON (MANCHESTER), MA |
| 9 | Atlanta | 2.105 | ATL GA | ATLANTA, GA |
| 10 | Houston | 2.095 | HOU TX | HOUSTON, TX |
| 11 | Tampa-St. Pete (Sarasota) | 1.641 | TAM FL | TAMPA-ST. PETE (SARASOTA), FL |
| 12 | Phoenix (Prescott) | 1.632 | PHX AZ | PHOENIX, AZ |
| 13 | Detroit | 1.613 | DHT MI | DETROIT, MI |
| 14 | Seattle-Tacoma | 1.559 | SEA WA | SEATTLE-TACOMA, WA |
| 15 | Minneapolis-St. Paul | 1.521 | MIN MN | MINNEAPOLIS-ST. PAUL, MN |
| 16 | Miami-Ft. Lauderdale | 1.465 | MF FL | MIAMI-FT. LAUDERDALE, FL |
| 17 | Denver | 1.391 | DEN CO | DENVER, CO |
| 18 | Cleveland-Akron (Canton) | 1.318 | CLE OH | CLEVELAND, OH |
| 19 | Orlando-Daytona Bch-Melbrn | 1.315 | ORD FL | ORLANDO-DAYTONA BCH-MELBRN, FL |
| 20 | Sacramnto-stkton-Modesto | 1.191 | SAC CA | SACRAMENTO-STKTON-MODESTO, CA |

| 1 | 2 | 3 | 4 | 5 | 6 | 7 | 8 | 9 | 10 |

USERS
MARKETS
MAX-SPOT RULE

| 134 | Spot Allocation Rule | | | |
|---|---|---|---|---|
| | 1 (ie: Mon Only) | 45<br>75<br>75+ | | 136 |
| | 2 (ie: Sa - Su) | 45<br>75<br>75+ | | 138 |
| | 3 (ie: Mon-Tue/F) | 45<br>75<br>75+ | | 140 |
| | 5 (ie: M - F) | 45<br>75<br>75+ | | 142 |
| | 7 (ie: M - Su) | 45<br>75<br>75+ | | 144 |

SAVE

FIG. 7

| INPUT | | |
|---|---|---|
| FIELD NAME | DATA TYPE | EXAMPLE |
| CLI | STRING[4] | KEUR |
| PROD | STRING[4] | 4Q15 |
| EST | STRING[4] | 001 |
| MARKET CODE | STRING[50] | ABQ NM |
| MARKET NAME | STRING[255] | ALBUQUERQUE-SANTA FE, NM |
| STATION | STRING[4] | KOAT |
| NETWORK | STRING[4] | ABC |
| DAYS | STRING[10] | M-F |
| TIME | STRING[20] | 7-9A |
| DP | STRING[4] | EM |
| LEN | STRING[4] | :15 |
| PROGRAM NAME | STRING[255] | GOOD MORNING AMERICA |
| %US POP | DECIMAL | 0.59 |
| GROSS DOLLARS | DECIMAL | 4686 |
| NET DOLLARS | DECIMAL | 3983.1 |
| BUY SPOTS | INTEGER | 0 |
| BUY_DEMO_01 | DECIMAL | 132 |
| BUY_DEMO_02 | DECIMAL | 169.4 |
| BUY_DEMO_03 | DECIMAL | 1265 |
| BUY_DEMO_04 | DECIMAL | 1166 |
| BUY_DEMO_05 | DECIMAL | 344.7 |
| BUY_DEMO_06 | DECIMAL | 0 |
| BUY_DEMO_07 | DECIMAL | 0 |
| BUY_DEMO_08 | DECIMAL | 0 |
| BUY_DEMO_09 | DECIMAL | 0 |

FIG. 8

| Select | FILE TYPE | CLIENT | PRODUCT | ESTIMATE | FILE NAME | SYSTEM TS | STATUS | #RECORDS | COMMENTS |
|---|---|---|---|---|---|---|---|---|---|
| ○ | OX_BUY | DUMY | UNWD | 0087 | ed_20160618_141329.txt | 18-Jun-2016 02:20:16 PM | NEW | 3552 | 3Q16 Merial All Dayparts |
| ○ | OX_BUY | DUMY | UNWD | 0086 | ed_20160611_133328.txt | 11-Jun-2016 01:35:17 PM | NEW | 5934 | 3Q16 Reckitt Buy File All Dayparts |
| ○ | OX_BUY | DUMY | UNWD | 0085 | ed_20160522_141027.txt | 22-May-2016 02:15:17 PM | NEW | 554 | 3Q16 Boston Beer Inventory |
| ○ | OX_BUY | DUMY | UNWD | 0085 | ed_20160522_140408.txt | 22-May-2016 02:10:16 PM | NEW | 554 | 3Q16 AZ EN |
| ○ | OX_BUY | DUMY | UNWD | 0084 | ed_20160510_143955.txt | 10-May-2016 02:40:19 PM | NEW | 468 | 3Q16 AZ Evening News |
| ○ | OX_BUY | DUMY | UNWD | 0084 | ed_20160506_102040.txt | 06-May-2016 10:25:19 AM | NEW | 467 | |
| ○ | OX_BUY | DUMY | UNWD | 0075 | ed_20160429_140215.txt | 29-Apr-2016 02:05:16 PM | NEW | 25870 | 1Q16 Reckitt Rerate - 3Q16 JUL15 BOOK Doug - 6/8 |
| ○ | OX_BUY | DUMY | UNWD | 0078 | ed_20160429_130405.txt | 29-Apr-2016 01:10:17 PM | NEW | 25817 | 2Q16 Reckitt Rerate - 2Q16 MAY15 BOOK Doug - 6/8 |
| ○ | OX_BUY | DUMY | UNWD | 0075 | ed_20160429_123612.txt | 29-Apr-2016 12:40:17 PM | NEW | 25870 | 1Q16 RECKITT RERATE - 1Q16 FEB16 BOOK |
| ○ | OX_BUY | DUMY | UNWD | 0078 | ed_20160429_120356.txt | 29-Apr-2016 12:05:17 PM | NEW | 25817 | 2Q16 RECKITT RERATE - 4Q15 NOV15 BOOK |

| OUTPUT 180 | | |
|---|---|---|
| FIELD NAME | DATA TYPE | EXAMPLE |
| WEEK1_BUYSPOTS | INTEGER | 0 |
| WEEK2_BUYSPOTS | INTEGER | 1 |
| WEEK3_BUYSPOTS | INTEGER | 2 |
| WEEK4_BUYSPOTS | INTEGER | 1 |
| WEEK5_BUYSPOTS | INTEGER | 3 |
| WEEK6_BUYSPOTS | INTEGER | 1 |
| WEEK7_BUYSPOTS | INTEGER | 1 |
| WEEK8_BUYSPOTS | INTEGER | 2 |
| WEEK9_BUYSPOTS | INTEGER | 4 |
| WEEK10_BUYSPOTS | INTEGER | 2 |

FIG. 10

SYSTEM AND METHOD FOR GOAL-ORIENTED GENERATION OF ADVERTISING SPOT SETS

CROSS-REFERENCE TO RELATED APPLICATION

This application is a non-provisional of, and claims the benefit and priority of, U.S. Provisional Patent Application No. 62/360,010 filed on Jul. 8, 2016. The entire contents of such application are hereby incorporated by reference.

BACKGROUND

Across the United States, there are a relatively large number of broadcast television (TV) stations that generate TV programming. These broadcast TV stations generate revenue by selling advertising spots. A commercial is aired in the spots or commercial breaks during TV programs. A buyer of spots (e.g., a manufacturer or its broker) contacts one of these TV stations to purchase spots for its commercial or creative promotion. The TV station informs the buyer of its available inventory of the spots. In purchasing spots from a single TV station, there are a relatively high quantity of variables to analyze, such as the time of day when the commercial will air, the specific TV program during which the commercial will air, the demographics of the TV households associated with the TV program, the advertising cost and many other variables. Therefore, the purchasing process can be lengthy, complex and burdensome even for a single TV station.

Furthermore, the buyer may wish to air the same advertising campaign across an entire territory, such as the United States, as part of a national advertising project. This adds to the labor, complexity and burden of the purchasing process. In an attempt to procure spots for a national advertising project, the buyer must undergo the same burdensome purchasing process for all of the TV stations distributed throughout the United States.

This burden is compounded when the targeted TV stations include independent TV stations, such as local, independent or partially-independent TV stations. Each independent TV station, known in the industry as an unwired station, produces some or all of its TV programs independent from the other TV stations. For example, a local TV station may be affiliated with a TV network. In this case, the local TV station can produce some of its own TV programs and receive other TV programs from its affiliated TV network. In another example, a local TV station can be entirely unaffiliated with any TV network, in which case the local TV station can produce all of its own TV programs on a stand-alone basis.

Each independent TV station, whether a local TV station or other independent TV station, has an inventory of advertising spots that is isolated from the other TV stations targeted by the purchaser. This requires a separate spot analysis process for each of the separate inventories. Therefore, the purchasing labor can be multiplied by as much as ten times, fifty times or more depending upon the quantity of independent TV stations involved. Also, it can be difficult to evaluate the buyer's progress toward satisfying the buyer's national goals for the creative promotion. This is because each independent TV station has its own inventory data set, isolated and independent of the other stations. Therefore, this independent programming of TV stations can exacerbate the purchasing problems described above. For example, the isolated spot inventories of local TV stations can make it significantly more difficult to procure suitable spots for a territory-wide project that satisfies the advertising goals of the purchaser.

The foregoing background describes some, but not necessarily all, of the problems, disadvantages, challenges and shortcomings related to purchasing advertising spots.

SUMMARY

The method, in an embodiment, includes receiving spot inventory data associated with a plurality of TV stations. The TV stations are associated with a plurality of TV programs. Also, the TV stations are operable to display the TV programs in a territory. The spot inventory data corresponds to a plurality of advertising spots that are selectable to form a plurality of different spot sets that are available for airing at least one commercial during one or more of the TV programs.

The method also includes receiving a plurality of variables. The variables include: (a) at least one rule variable that corresponds to at least one advertising rule; and (b) at least one goal variable that corresponds to at least one advertising goal. The at least one advertising goal includes a spot distribution goal associated with a plurality of different markets within the territory. In addition, the method includes: (a) applying the at least one advertising rule to generate a plurality of the spot sets; (b) performing a randomization function applicable to the generated spot sets; and (c) selecting one of the generated spot sets based, at least in part, on a proximity to the at least one advertising goal.

In an embodiment, the system includes a data storage device having or storing a plurality of computer-readable instructions that are executable by at least one processor to receive spot inventory data associated with a plurality of TV stations. The spot inventory data corresponds to a plurality of advertising spots that are selectable to form a plurality of different spot sets. The instructions are also executable to receive a plurality of variables. The variables include: (a) at least one rule variable corresponding to at least one advertising rule; and (b) at least one goal variable corresponding to at least one advertising goal. Also, the instructions are executable to apply the at least one advertising rule and the at least one advertising goal to form at least one of the spot sets. The formed spot set is available for airing at least one commercial during one or more of the TV programs. Furthermore, the instructions are executable to generate an output indicating or specifying the formed spot set.

The system, in another embodiment, includes a data storage device having a plurality of computer-readable instructions that are executable by at least one processor to receive spot inventory data associated with a plurality of TV stations. The TV stations are associated with a plurality of TV programs produced independent of each other. Also, the TV stations are operable to control a performance of the TV programs in a territory. The spot inventory data corresponds to a plurality of different advertising spots. The instructions are executable to receive at least one rule variable corresponding to at least one advertising rule. The at least one advertising rule includes a requirement corresponding to at least one day of week. The day of week is specified by the at least one rule variable. Also, the instructions are executable to receive at least one goal variable. The at least one goal variable specifies a spot distribution goal associated with a plurality of different markets within the territory;

In addition, the instructions are executable to filter the spot inventory data in accordance with the at least one advertising rule, wherein the filtering results in a plurality of eligible advertising spots. The instructions are also executable to form a set of the eligible advertising spots that is closer to the spot distribution goal than at least one other set of the eligible advertising spots that could be formed. Furthermore, the instructions are executable to generate purchase order data corresponding to the formed set of eligible spots.

Additional features and advantages of the present disclosure are described in, and will be apparent from, the following Brief Description of the Drawings and Detailed Description.

BRIEF DESCRIPTION OF THE DRAWINGS

FIG. 3 is a chart illustrating an example of an embodiment of the goal categories and goals of the base optimizer of the procurement system.

FIG. 4 is a top view of an embodiment of a market selection interface of the procurement system.

FIG. 5 is top view of an embodiment of a first input interface of the procurement system.

FIG. 7 is top view of an embodiment of a spot frequency interface of the procurement system.

FIG. 8 is top view of an embodiment of an input interface of the procurement system.

FIG. 9 is top view of an embodiment of a listing interface of the procurement system.

FIG. 10 is top view of an embodiment of a success interface of the procurement system.

DETAILED DESCRIPTION

Figure 1:
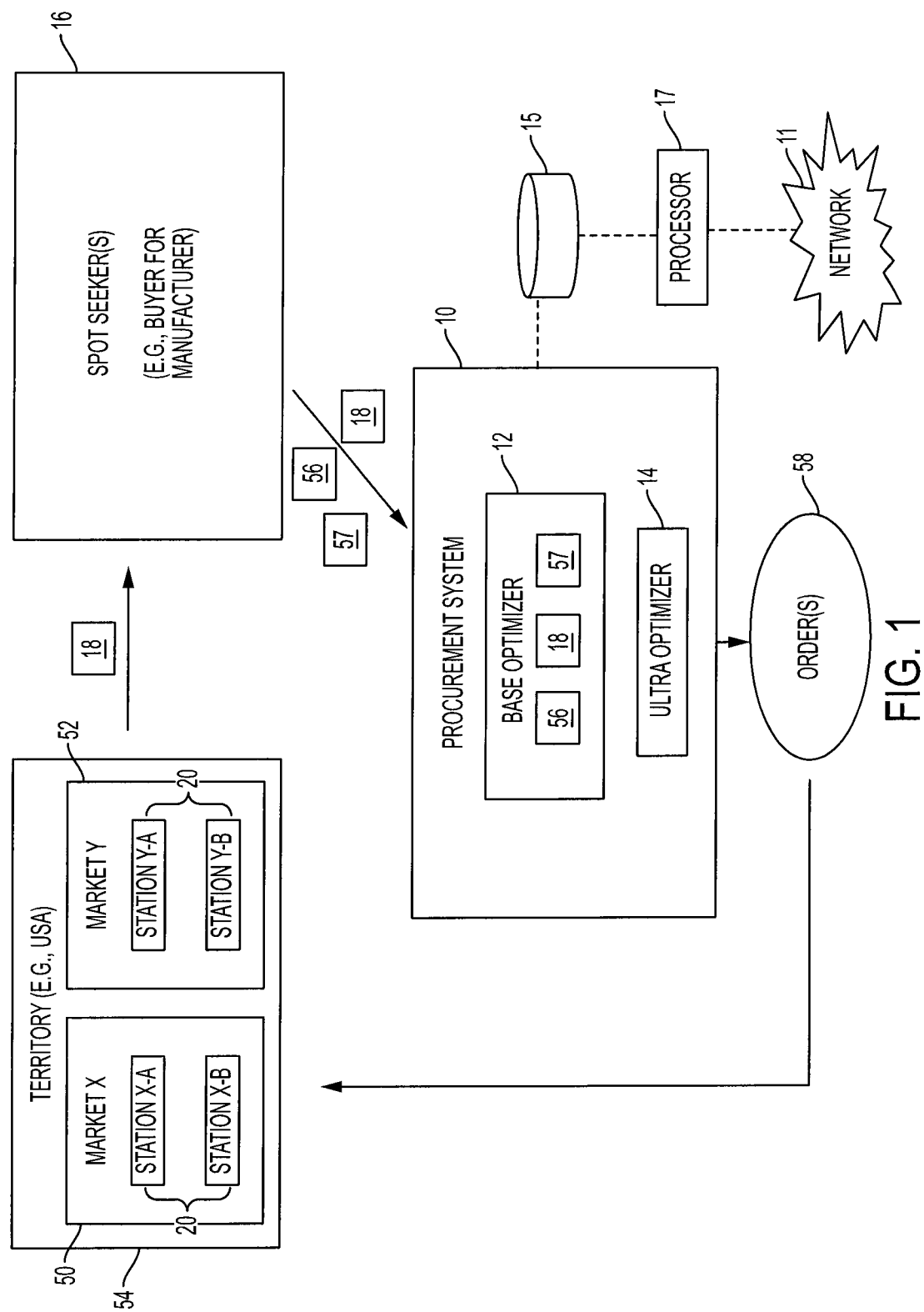
FIG. 1 is a schematic diagram illustrating an embodiment of the procurement system operable with spot seekers for placing orders with respect to a plurality of different markets dispersed throughout a territory.

As illustrated in FIG. 1, in an embodiment, the goal-oriented procurement system 10 is operatively coupled to, and accessible through, a network 11, such as the Internet, another suitable wide area network or a local area network. The procurement system 10 includes a base optimizer 12 and an ultra optimizer 14. The procurement system 10 includes, or is stored on, one or more data storage mediums, memory devices or data storage devices, such as database 15. In operation, one or more data processors, such as processor 17, executes such computer-readable instructions to perform the functions of the procurement system 10. Depending upon the embodiment, the processor 17 can include a central processing unit, microprocessor, circuit, circuitry, controller or other data processing device.

The procurement system 10 (including optimizers 12, 14) includes a plurality of computer-readable instructions, software, computer code, computer programs, logic, data, data libraries, data files, graphical data and commands that are executable by processor 17. In operation, the processor 17 cooperates with the procurement system 10 to perform the functions described in this description. From time to time in this description, procurement system 10 (or optimizers 12, 14 thereof or portions thereof) may be described as performing various functions with the understanding that such functions involve the execution role of the processor 17 or another processor.

In an embodiment, an entity, operator or system implementor maintains and operates the procurement system 10 for the benefit of spot seekers 16. A spot seeker 16 can include: (a) a contractor, buyer, broker or intermediary acting on behalf of a manufacturing business or service provider business, seeking to advertise products or services for such a business; (b) such manufacturing business, service provider business or other organization (e.g., a not-for-profit entity), seeking to directly advertise its products or services; or (c) any representative, employee, agent or user affiliated with any of the foregoing parties. As described below, a spot seeker 16 can use or benefit from the procurement system 10 to establish a TV advertising campaign or TV advertising project based on the spot seeker's creative promotion (e.g., a commercial). Depending upon the embodiment, users of the procurement system 10 can include a representative of a spot seeker 16, a representative of the system implementor, representatives of local TV stations 20, a combination of such representatives or other individuals or entities.

In an embodiment, the procurement system 10 receives and stores advertising spot inventory data 18 sourced, derived from, provided by or associated with a plurality of TV stations. In an embodiment, the TV stations have some level of independent programming, such as local TV stations 20. Though the local TV stations 20 are illustrated and described as broadcast TV stations, it should be appreciated that they can alternatively include cable TV stations or Internet-based TV stations.

In an embodiment described below, the local TV stations 20 directly or indirectly transmit or provide the advertising spot inventory data 18 to the spot seekers 16 through an electronic transmission. Such transmission can occur through application programming interface (API)-based communication between the computers or network access devices of the spot seekers 16 and the computers or network access devices of the local TV stations 20. Alternatively, such transmission can occur through electronic outputs generated by representatives of the local TV stations 20. In another embodiment, the representatives of the spot seekers 16 manually retrieve part or all of the spot inventory data 18 from emails, papers or other materials provided by TV stations 20 in electronic or physical form. Spot seekers 16 electronically input or compile such retrieved spot inventory data 18 using any suitable input device, such as a keyboard or touchscreen. After the user (e.g., system implementor or spot seeker 16) has the spot inventory data 18 in electronic form (e.g., a spreadsheet or data file), the user transmits, uploads, transfers or emails the spot inventory data 18 to the procurement system 10. Depending upon the embodiment, the spot inventory data 18 can be input into the procurement system 10 automatically, semi-automatically or manually.

Figure 2:
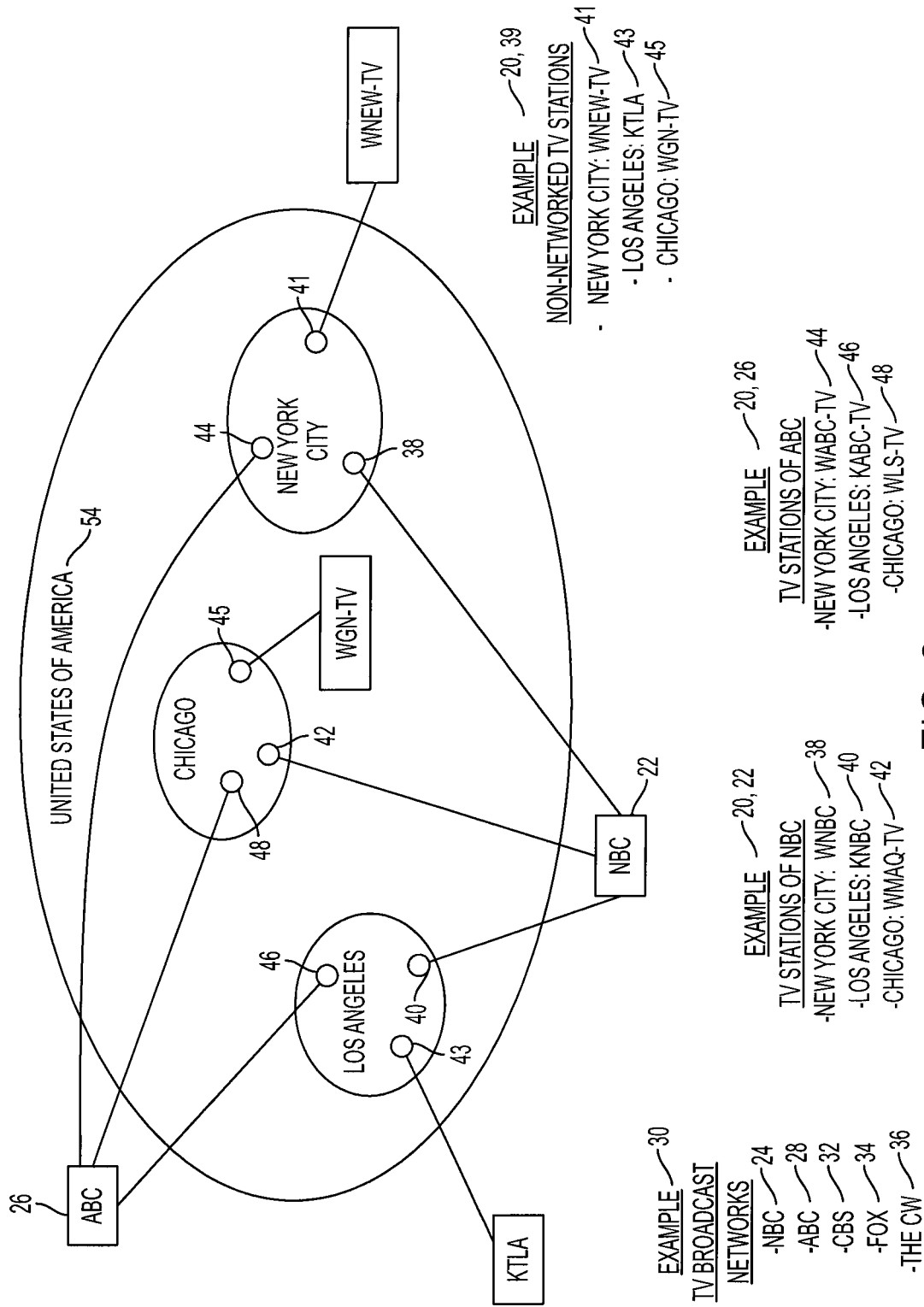
FIG. 2 is schematic diagram illustrating examples of different types of broadcast TV stations within a territory, including independent TV stations.

Referring to FIG. 2, in an example of an embodiment, the local TV stations 20 include: (a) NBC stations 22 owned by or affiliated with the NBC organization or the NBC network 24; and (b) ABC stations 26 owned by or affiliated with the ABC organization or the ABC network 28. In this example, the NBC network 24 and ABC network 28 are two of a plurality of different TV broadcast networks 30, including CBS network 32, FOX network 34 and The CW network 36.

Also, in this example, the NBC stations 22 include: (a) local station WNBC 38 for the New York City area or market; (b) local station KNBC 40 for the Los Angeles area or market; and (c) local station WMAQ-TV 42 for the Chicago area or market. Furthermore, in this example, the ABC stations 26 include: (a) local station WABC-TV 44 for the New York City area or market; (b) local station KABC 46 for the Los Angeles area or market; and (c) local station WLS-TV 48 for the Chicago area or market. In the example shown in FIG. 2, the stations 22 of NBC network 24 generate or run programming independent of the stations 26 of ABC network 28. Furthermore, the local NBC stations 38, 40, 42 produce at least some amount of programs independent from each other, and they share some amount of programs controlled by the NBC network 24.

Likewise, the local ABC stations 44, 46, 48 produce at least some amount of programs independent from each other, and they share some amount of programs controlled by the ABC network 24. Continuing with this example, there are a plurality of completely independent or decoupled TV stations 39 (i.e., stations that are not coupled to a common TV programming source) including: (a) local station WNEW-TV 41 for the New York City area or market; (b) local station KTLA 43 for the Los Angeles area or market; and (c) local station WGN-TV 45 for the Chicago area or market. The stations 41, 43, 45 are independent of each other, and each such station generates its own programming independent of the other stations.

Referring back to FIG. 1, the example stations X-A and X-B are located within a geographic market area or market 50 indicated as Market X, and the example stations Y-A and Y-B are located within a geographical market area or market 52 indicated as Market Y. The markets 50, 52 are located within a territory 54, such as the United States of America or any other country, region or territory.

In an embodiment, the procurement system 10 stores one or more goal variables 56 and one or more rule variables 57 received from the spot seeker 16. The spot seeker 16 can directly or indirectly send or transmit the goal and rule variables 56, 57 alone or in conjunction with local TV stations 20, the system implementor or other entities cooperating with the spot seeker 16. The goal and rule variables 56, 57 can be based, at least in part, on decisions, aspirations, preferences or requirements of the applicable spot seeker 16 or TV stations 20. Depending upon the embodiment, the goal variables 56 and rule variables 57 can include a number or numeral, a string (e.g., text) or a combination thereof. In an embodiment, the spot seeker 16 electronically transmits part or all of the goal variables 56 and rule variables 57 to the procurement system 10. Such transmission can occur through API-based communication between processor 17 and the computers or servers of the spot seeker 16 or system implementor. Alternatively, such transmission can occur through inputs received from representatives of the spot seeker 16 or system implementor.

In another embodiment, the representatives of the system implementor manually retrieve part or all of the goal and rule variables 56, 57 from the spot seeker 16. Next, the representatives input the retrieved variables 56, 57 into the base optimizer 12 of the procurement system 10. Depending upon the embodiment, the goal and rule variables 56, 57 can be input into the procurement system 10 automatically, semi-automatically or manually.

Figure 2A:
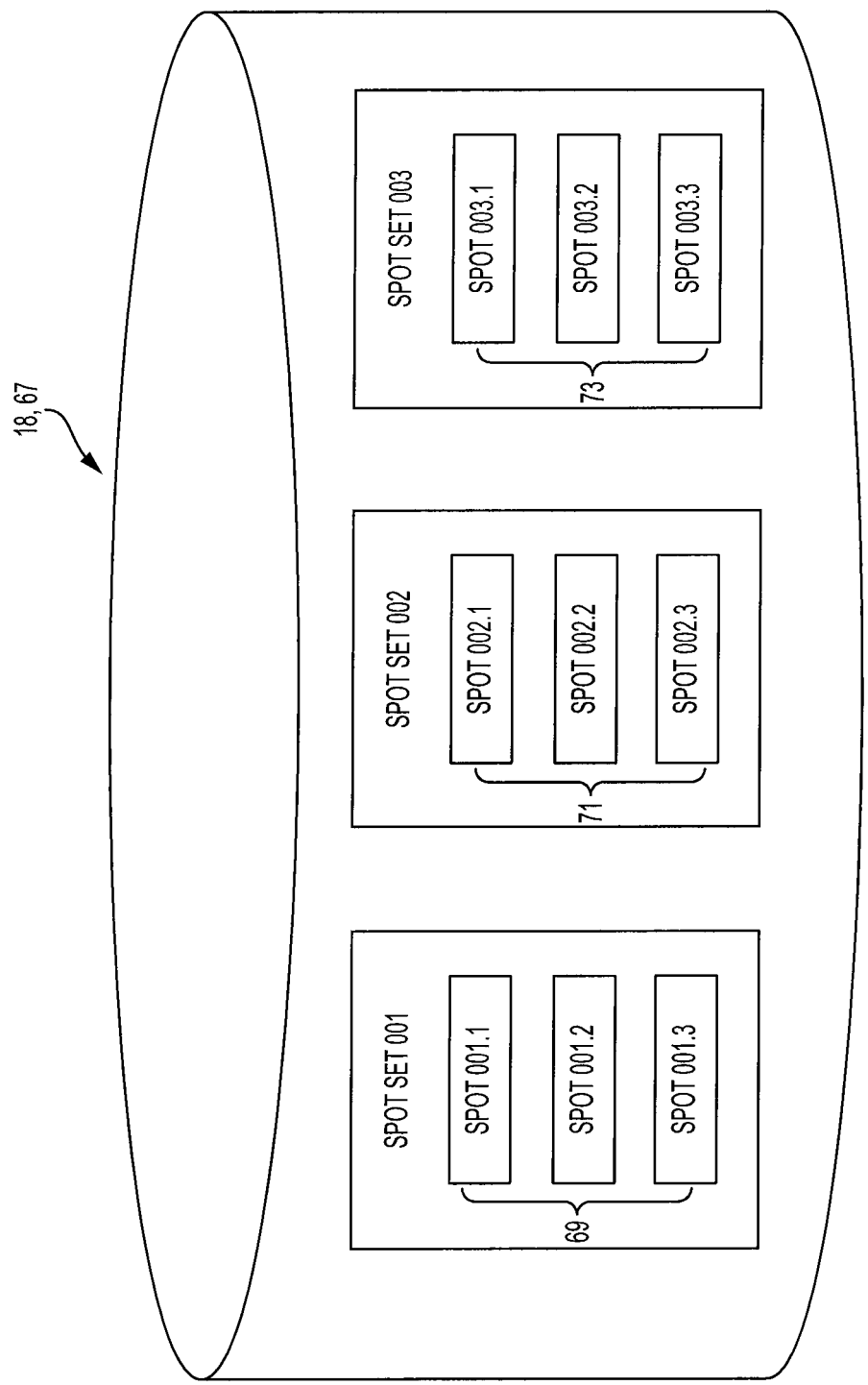
FIG. 2A is a schematic diagram illustrating an example of an embodiment of spot inventory data, including a plurality of different spot sets that can be extracted from the spot inventory data.

As described further below, after the procurement system 10 is populated with the spot inventory data 18 and variables 56, 57, the optimizers 12, 14 process such data and variables. Referring to FIG. 2A, the spot inventory data 18 includes a pool of advertising spots. The pool can contain enough spots to form hundreds, thousands or millions of different combinations or sets of spots. During the processing, the procurement system 10 can retrieve spots to form a single spot set, or the procurement system 10 can retrieve spots to form a plurality of different spot sets, as illustrated in FIG. 2A.

The spot inventory data 18 includes spots that can be retrieved to form various spot sets, such as spot sets 67 illustrated in FIG. 2A, which include spot sets 001, 002 and 003. Spot set 001 includes spots 69, spot set 002 includes spots 71, and spot set 003 includes spots 73. In this embodiment, all of the spot sets 67 are unique or otherwise different from each other. In this example, some of the spot sets 67 are closer to the spot seeker's goals than others. In another example, the procurement system 10 can pick spots to form one or more of the following spot sets:

TABLE A

| SPOT SET ID | SPOT SET |
| --- | --- |
| A01 | Set of 12 spots as follows:<br>8 Spots: Air Time: thirty (30) seconds; Station: WNBC; TV Program: Law & Order; Date: Jun. 24, 2016 through Jul. 24, 2016; Day(s): Mondays (8pm Eastern) and Fridays (8pm Eastern).<br>4 Spots: Air Time: thirty (60) seconds; Station: WNEW; TV Program: Law & Order; Date: Jun. 24, 2016 through Jul. 24, 2016; Day(s): Wednesdays (7pm Eastern). |
| A02 | Set of 12 spots as follows:<br>6 Spots: Air Time: fifteen (15) seconds; Station: WNEW; TV Program: Law & Order; Date: Jun. 24, 2016 through Jul. 24, 2016; Day(s): Mondays (8pm Eastern), Wednesdays (8pm Eastern) and Fridays (8pm Eastern).<br>6 Spots: Air Time: fifteen (15) seconds; Station: WABC; TV Program: Law & Order; Date: Jun. 24, 2016 through Jul. 24, 2016; Day(s): Mondays (8pm Eastern). |
| A03 | Set of 12 spots as follows:<br>7 Spots: Air Time: thirty (30) seconds; Station: WABC; TV Program: Law & Order; Date: Jun. 24, 2016 through Jul. 24, 2016; Day(s): Mondays (10pm Eastern) and Saturdays (7pm Eastern).<br>5 Spots: Air Time: thirty (60) seconds; Station: WNBC; TV Program: Law & Order; Date: Jun. 24, 2016 through Jul. 24, 2016; Day(s): Thursdays (7pm Eastern). |

It should be appreciated that, in an embodiment, the procurement system 10 can generate a single spot set (for example, spot set 003) by picking spots from the pool of spot inventory data 18. In such example, the procurement system 10 generates single spot set 003 without generating spot set 001 or 002 or any other spot sets. In such example, the spot seeker 16 may use the singly-generated spot set 003 to launch the desired advertising project.

It should also be appreciated that, in another embodiment, the procurement system 10 can generate a plurality of different spot sets (for example, spot sets 001, 002 and 003) by picking spots from the pool of spot inventory data 18 and forming the different spot sets 001, 002 and 003. As described below, the procurement system 10 generates the spot sets 001, 002 and 003 at a preliminary evaluation stage. Later, the procurement system 10 selects one of the generated spot sets (e.g., spot set 002) based, in part, on evaluating which one of the spot sets is closer to the goals of the spot seeker 16. In such example, the spot seeker 16 may use the selected spot set 002 to launch the desired advertising project.

After the selection is complete, the spot seeker 16 or system implementor places one or more purchase orders 58 with the local TV stations 20, as illustrated in FIG. 1. After receiving the orders 58, the local TV stations 20 air the associated commercials or creative promotions in the selected or generated spot set in accordance with the specifications of the orders 58.

Figure 2B:
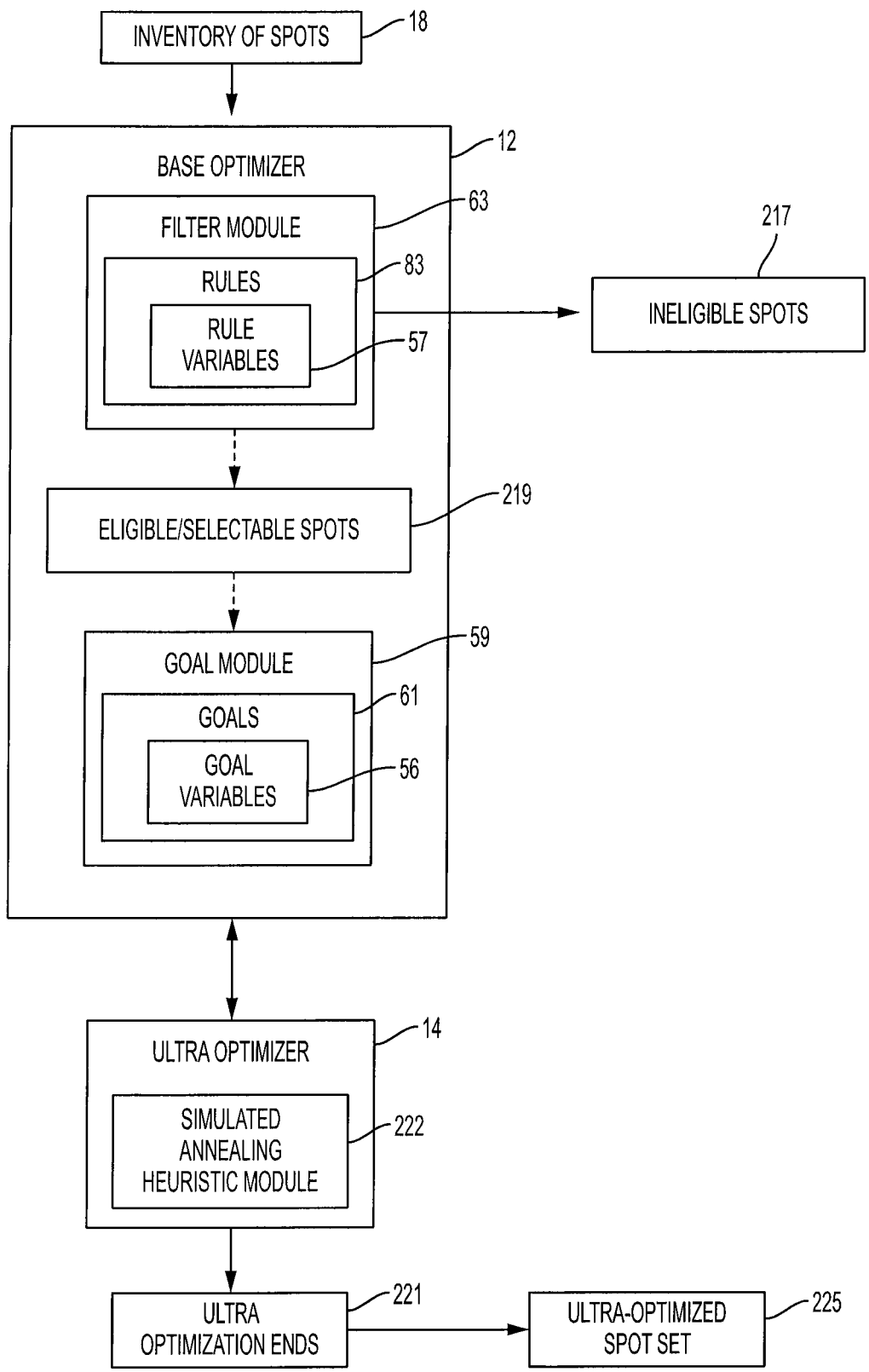
FIG. 2B is a schematic diagram illustrating an embodiment of the base optimizer and ultra optimizer and their interoperability with each other.

Referring to FIG. 2B, in an embodiment the base optimizer 12 of the procurement system 10 includes a filter module 63 and a goal module 59. The goal module 59 includes data corresponding to a plurality goals 61, and such data includes a plurality of goal variables 56.

As illustrated in FIG. 3, the goal module 59 defines or specifies a plurality of different advertising goal categories 60. The goal categories 60 are associated with a plurality of different advertising-related goals 61 of the spot seeker 16. Each goal 61 includes a statement or condition involving one or more goal variables 56 that are selectable by the spot seeker 16. In some embodiments, the goals 61 include qualitative factors. In other embodiments, the goal 61 include quantitative factors. In yet other embodiments, the goals 61 include a combination of qualitative and quantitative factors.

In the example shown, the goal categories 60 include a population goal category 62, cost goal category 64, territorial spot distribution goal category 66, spot frequency goal category 68, demographic goal category 70 and territorial impression goal category 72. In an embodiment, the population goal category 62 is based on a market database such as the database published by The Nielson Company, which has over two hundred markets, known as Designated Market Areas (DMAs), distributed across an entire territory, such as the United States. Such database associates a different TV household population with each of the markets. Based on these populations, such database assigns a territorial population percentage to each one of the markets.

For example, the market database can include markets A, B, C and D for an entire territory, such as the United States. The market database could provide market A with a 10% population allocation, market B with a 40% population allocation, market C with a 13% population allocation, and market D with a 37% population allocation. In this example, the population goal category 62 is associated with a goal condition 74. The goal condition 74 specifies a preference that the formed spot set satisfies a designated percentage of the United States population of TV households. Such percentage, a goal variable 56, is selectable or adjustable by the spot seeker 16. In the example shown, the goal variable 56 includes population goal variables 50%, 77% and/or X %. In response, the procurement system 10 ranks or compares the formed spot sets based on their proximity to achieving the designated percentage for the markets A-D.

In an embodiment, the cost goal category 64 is associated with goal condition 76. The goal condition 76 specifies a preference that the formed spot set results in a designated advertising cost, such as being equal to a designated cost per one thousand impressions ("CPM") of an airing of a commercial in a spot, being less than a designated CPM or being within a CPM range. A single impression, in an embodiment, is a single count of a single viewer (natural person) associated with a single TV household. Therefore, the airing of a commercial in a spot can result in three impressions for a single TV household having three people or viewers. With respect to the cost goal category 64, each dollar amount, a goal variable 56, includes the designated dollar amounts for the CPM, $4.00, $6.00, $6.75 and $8.25. In operation, the spot seeker 16 can select or specify one of these dollar amounts or input another desirable dollar amount.

In an embodiment, the territorial spot distribution goal category 66 is associated with a goal condition 78. The goal condition 78 specifies a preference that the spots within the formed spot set satisfy a designated distribution throughout the territory 54 (FIG. 1). In the example shown, the goal condition 78 includes a preference that the spot seeker's selected markets 50, 52 each have: (a) a designated ratio of the quantity of spots per market (e.g., Ratio=Single Market's Spots/Total Quantity of Spots of all Selected Markets); or (b) a designated quantity of spots based on an average (e.g., Total Spots/Total Quantity of Spots of all Selected Markets=Average). Each such ratio and quantity, a goal variable 56, is selectable and adjustable by the spot seeker. In the example shown, the goal variable 56 includes: (a) one of the variable ratios (e.g., 1/3, 1/4 or 1/X) or any other desirable ratio X; or (b) one of the variable averages (e.g., 80) and constant adjusters (e.g., +/−10 or +/−X) or any other desirable average or constant adjuster. In an embodiment, the average calculation of the goal condition 78 includes one or more weight factors or weight multipliers for designated markets 50, 52 identified by the spot seeker 16.

In an embodiment, the spot frequency goal category 68 is associated with a goal condition 80. The goal condition 80 specifies a preference for a designated quantity of spots per specified days. Such quantity, a goal variable 56, is selectable or adjustable by the spot seeker 16. In the example shown, the goal variables 56 include 1, 2, and X for Monday as well as 8, 10, 15, and X for Monday through Friday.

In an embodiment, the demographic goal category 70 is associated with a goal condition 82. The goal condition 82 specifies a preference for a designated demographic group selected by the spot seeker 16, such as a designated household category based on an age variable, gender variable, race variable, ethnicity variable, other demographic variable or a combination thereof. Each such demographic variable, a goal variable 56, is selectable or adjustable by the spot seeker 16. In the example shown, the goal variables 56 include 20-30, X-Y and Z. For example, the spot seeker 16 can select or specify one of these demographic variables or any other desirable demographic variable X (lower age limit), Y (upper age limit) or Z (sex).

In an embodiment, the territorial impression goal category 72 is associated with a goal condition 84. The goal condition 84 specifies a preference for a designated quantity of impressions within the entire territory 54 (FIG. 1) sought by the spot seeker 16 during a designated period (e.g., one week). Such quantity, a goal variable 56, is selectable and adjustable by the spot seeker 16. In the example shown, the goal variables 56 include 5,000, 8,000 to 10,000 and X. The spot seeker 16 can select or specify one of such impression variables or any other desirable impression variable X.

Referring back to FIG. 2B, in an embodiment the filter module 63 includes data corresponding to a plurality of rules 83, and such data includes a plurality of rule variables 57. The rules 83, in an embodiment, include mandates or requirements, such as minimum thresholds, maximum thresholds, limits, mandatory inclusions, mandatory exclusions and other restrictions related to the one or more desired spot sets. In an embodiment described below, the operation of the filter module 63 results in: (a) eligible or selectable spots; and (b) ineligible or non-selectable spots.

In an embodiment, the filter module 63 also stores market data (e.g., TV household count or census-related information) related to the markets 50, 52 (FIG. 1). In another embodiment, the procurement system 10 is operatively coupled to a separate database that stores such market data. In either such embodiment, at least one of the rules 83 requires that the formed spot set be located within one or more particular markets 50, 52 specified by the spot seeker 16.

To facilitate this step, the procurement system 10 generates a market selection interface 86 (FIG. 4) in response to an input from a user, such as a representative of the system implementor or the spot seeker 16. In the example shown, the market selection interface 86 displays the markets 50, 52, including a list of over two hundred markets or DMAs compiled and published by The Nielson Company, which is updated yearly. Each such market 50, 52 or DMA is a rule variable 57 (FIG. 2B).

As shown, the market selection interface 86 also displays: (a) the different TV household population percentages 88 associated with the different markets 50, 52; (b) the ranks 90 of the markets 50, 52 based on their TV household population percentages 88; (c) the different market codes 92 associated with the different markets 50, 52; and (d) the different market names 94 associated with the different markets 50, 52. In operation, the system implementor or spot seeker 16 selects one or more of the markets 50, 52. After the selections are made, the procurement system 10 uploads or stores a data file having the market data associated with the selected markets 50, 52. In this example, selected markets 50, 52 become part of the rules 83, and the procurement system 10 excludes or blocks the formation of spot sets that do not fall within the selected markets 50, 52. For example, if a spot seeker 16 were to select Chicago and Atlanta, the procurement system 10 would exclude spots in all DMAs other than spots in Chicago and Atlanta.

Figure 5:
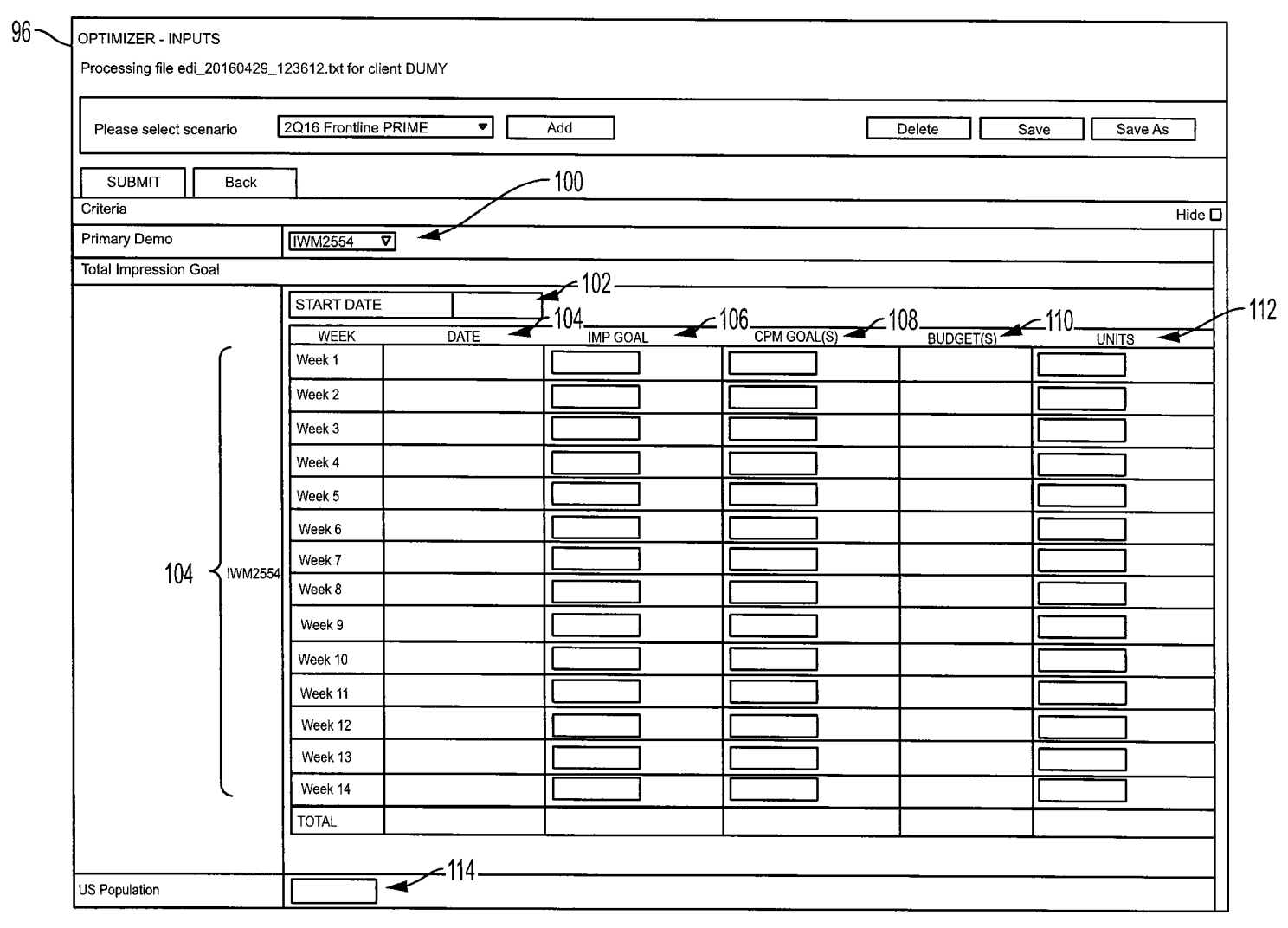
Figure 6:
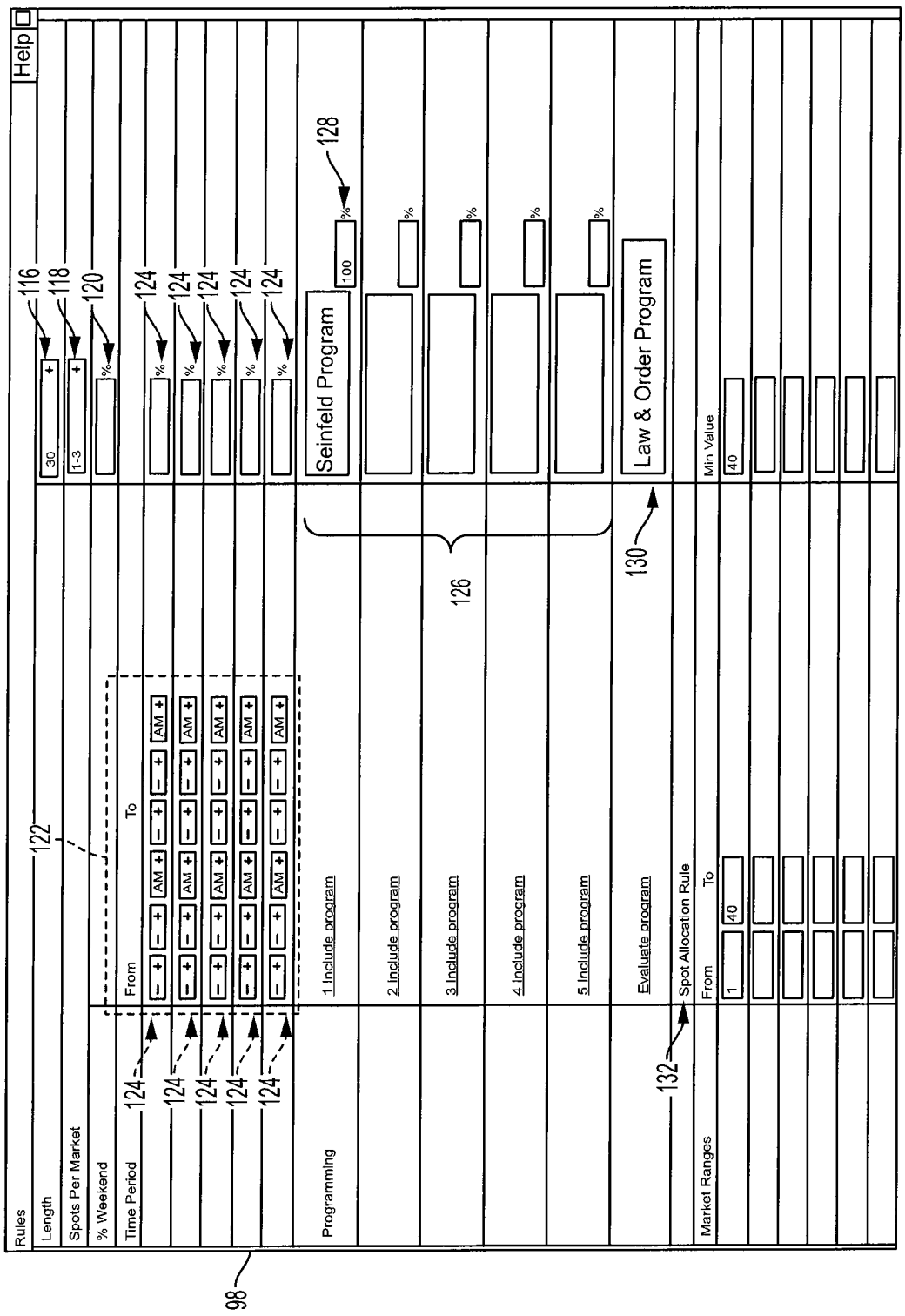
FIG. 6 is top view of an embodiment of a second input interface of the procurement system.

As illustrated in FIGS. 5-6, in an embodiment, the procurement system 10 displays first and second input interfaces 96 and 98 to receive inputs related to goals 61 (FIG. 3) and other factors and requirements, including, but not limited to, inputs related to rules 83. In another embodiment, the input interfaces 96, 98 are combined into a single input interface.

As illustrated in FIG. 5, the first input interface 96 includes or otherwise displays: (a) a demographic pull-down menu or selector 100, enabling the user to select the identifier or code (e.g., WM2554) corresponding to one of a plurality of different demographic goal variables, such as the goal variables of the goal condition 82 illustrated in FIG. 3; (b) a start date field 102 configured to receive the date (a rule variable 57) for the initial spot for the airing of the applicable advertising campaign; (c) an air date data field 104 configured to receive the week-by-week date (a goal variable 56 or rule variable 57) for the airing of the applicable commercial or creative promotion; (d) an impression goal data field 106 configured to receive any impression variable (e.g., 10,700) per week (a goal variable 56) as desired by the user; (e) a CPM goal data field 108 configured to receive a dollar amount of the CPM (e.g., $6.25), a goal variable 56; (f) a budget goal data field 110 configured to receive a dollar amount of the budget goal (e.g., $73,800), a goal variable 56, for the spot seeker's advertising project; (g) a unit data field 112 configured to receive the minimum number of spots (a rule variable 57) required for airing a commercial each week in each market; and (h) a United States TV household data field 114 configured to receive the desired minimum percentage (e.g., 77%) of the TV households in the territory (e.g., United States), a goal variable 56. It should be appreciated that, depending upon the embodiment, the inputs into the first input interface 96 can be categorized and treated as goal variables 56 or rule variables 57.

As illustrated in FIG. 6, the second input interface 98 includes or otherwise displays: (a) a spot airtime length pull-down menu or spot airtime length selector 116, enabling the user to select one spot airtime length from a plurality of different airtime time lengths, wherein each such time length indicates the airtime corresponding to the applicable spot (e.g., 15 seconds or 30 seconds), a rule variable 57; (b) a territorial spot distribution pull-down menu or selector 118, enabling the user to select one spots per market ratio (e.g., 1:3) from a plurality of different spots per market ratios, such as the ratios of the goal condition 78 (FIG. 3), a goal variable 56; (c) a weekend (Saturday and Sunday) percentage data field 120 requiring a user-specified, maximum percentage (e.g., 20%) of impressions, a rule variable 57, based on the spot-placed commercial aired on weekends; and (d) a time limit control panel 122 including a plurality of pull-down menus or selectors enabling the user to select a plurality of different schedules 124 (rule variables 57).

Each schedule 124 includes a specified starting time (AM/PM), a specified ending time (AM/PM) and a specified percentage date field configured to receive the user's specified percentage. Each such time and percentages is a rule variable 57. Such percentage represents a specified portion or allocation for all of the impressions based on the airing of a commercial within all of the spots. In this embodiment, the schedules 124 filter-out time periods that do not satisfy the time criteria set forth in the time limit control panel 122. For example, the user may input: (a) a first schedule 124 including a start time of 7:30 PM, an end time of 10:00 PM and a percentage of 30%; and (b) a second schedule 124 including a start time of 2:00 PM, an end time of 5:00 PM and a percentage of 70%. In operation, the procurement system 10 excludes all inventory of time periods that fall outside of such time and allocation requirements.

Also, as illustrated in FIG. 6, the second input interface 98 includes or otherwise displays a plurality of program inclusion data fields 126 configured to receive a TV program name (e.g., Seinfeld). Each such data field 126 is associated with a percentage 128 (a rule variable 57) selected or input by the user. The percentage 128 represents a specified portion or allocation of all of the impressions based on the airtime of a commercial placed in the spots. In the example shown, the percentage 128 is 100% for the Seinfeld program. In operation of the example shown, the procurement system 10 excludes all inventory of impressions associated with the spots other than those impressions estimated or determined to occur during the Seinfeld program.

In addition, as illustrated in FIG. 6, the second input interface 98 includes or otherwise displays at least one program exclusion data field 130 configured to receive a program name (e.g., Law & Order), a rule variable 57. In operation of the example shown, the procurement system 10 excludes all inventory of spots and corresponding impressions that occur during the Law & Order program. It should be appreciated that, depending upon the embodiment, the inputs into the second input interface 98 can be categorized and treated as goal variables 56 or rule variables 57.

Upon the user's activation of the spot allocation button 132 (FIG. 6), the procurement system 10 generates or displays a spot frequency interface 134 as illustrated in FIG. 7. Spot frequency interface 134 provides rules 83 (FIG. 2B) related to specified days, time or spot quantity per time period. For example, spot frequency interface 134 includes a Monday only (one day) data field set 136, a Saturday to Sunday only (two day) data field set 138, a Monday, Tuesday and Friday only (three day) data field set 140, a Monday to Friday only (five day) data field set 142 and a Monday to Sunday (seven day) data field set 144. In the example shown, each field within each data set 136, 138, 140, 142, 144 is associated with one of a plurality of program length periods 138, such as a forty-five minute program, a seventy-five minute program or a program extending more than seventy-five minutes. Each of these periods is a rule variable 57. In each field within each data set 136, 138, 140, 142, 144, the user can input or enter a rule variable 57 (e.g., text) representing or indicating limits or restrictions related to spots or the corresponding impressions. For example, for a forty-five minute program for data set 136, the user may enter "1" or "one spot" or "maximum of one spot." In operation of this example, the procurement system 10 selects a single spot for Monday-only, forty-five minute programs. In another example, for a seventy-five minute program for data set 136, the user may enter "2" or "two spots" or "maximum of two spots." In operation of this example, the procurement system 10 selects two spots for Monday-only, seventy-five minute programs. In yet another example, for a forty-five minute program for data set 142, the user may enter "4-5" or "four to five spots." In operation of this example, the procurement system 10 selects four to five spots per day for Monday through Friday, forty-five minute programs. It should be appreciated that, depending upon the embodiment, the inputs into the spot frequency interface 134 can be categorized and treated as goal variables 56 or rule variables 57.

After entering data through interfaces 86, 96, 98, 134, the procurement system 10 stores a database, data set or one or more input data files including the advertising spot inventory data 18, goal variables 56 and rule variables 57. In the example shown in FIG. 8, the procurement system 10 displays an input interface 145 which lists input files and input data sets by field name 146 and data type 148 for storing the advertising spot inventory data 18, goal variables 56 and rule variables 57. The examples 150 exemplify possible data input entries for such data. In the example shown, field name CLI indicates client code (i.e., a unique code identifying the spot seeker 16), PROD indicates product code, EST indicates estimate code or advertising project code, DP represents day part or part of day, LEN represents the airtime length of the creative promotion or commercial, Gross Dollars indicates an industry-standard suggested price charged by the stations for sales of the spots, Net Dollars indicates the actual price charged by the stations for sales of the spots, and BUY_DEMO_01 and the like indicates the quantity of impressions associated with a particular demographic group or category.

Next, the procurement system 10 bundles or aggregates all of the advertising spot inventory data 18, goal variables 56 and rule variables 57. This results in a master or aggregate file, such as aggregate file 152 shown in file listing interface 154 illustrated in FIG. 9. In the example shown, the file listing interface 154 displays a plurality of other aggregate files 156 associated with different advertising projects of various spot seekers 16, who may be clients of the system implementor. In this example, the file listing interface 154 also displays the products or product types 158 to be advertised, such as orange juice, clothing or automobiles.

Referring to FIG. 9, after the user selects one of the aggregate files 152, the base optimizer 12 and ultra optimizer 14 process the advertising spot inventory data 18, goal variables 56 and rule variables 57. In an example of an embodiment, the procurement system 10 instructs processor 17 to perform the following steps:

Step 160: Determine the maximum allowable spots per each line of spot inventory based on a rule 83 and one or more rule variables 57 (e.g., ono or more spot allocation rules).

Step 162: Calculate NET CPM.

Step 164: Based on the CPM calculation, rank all lines of spot inventory in the selected markets.

Step 166: Determine a first set of the selected markets that should be allocated.

Step 168: Allocate an initial quantity of spots to the first set of selected markets in order of the CPM rank up to the maximum allowable spots per each line of spot inventory, wherein such maximum is based on at least one rule 83 and rule variable 57.

Step 170: Repeat step 168 until the spot seeker's goal is reached, wherein the goal is based on one or more or all of the following factors: a population goal variable, cost goal variable, territorial spot distribution goal variable associated with a plurality of markets, spot frequency variable, demographic goal variable or territorial impression goal variable.

In an embodiment, steps 160-170 are performed in the particular sequence set forth above. In another embodiment, steps 160-170 are performed in a different, suitable sequence.

In an example of another embodiment, the procurement system 10 then instructs the processor 17 to perform the following steps:

Step 172: Select and allocate lines of spot inventory for the selected markets, resulting in first allocated spots.

Step 174: Of the first allocated spots, select and allocate spots with a lower CPM before moving to spots with a higher CPM, resulting in second allocated spots.

Step 176: Rank or sort the spots based on proximity to the specified population goal variable.

Step 178: Rank or sort the spots based on proximity to the territorial spot distribution goal variable using a binary tree approach.

Step 180: Swap or replace higher CPM lines of spot inventory with lower CPM lines of spot inventory across the markets in the territory, while generating or forming a spot set that is closest to satisfying the territorial spot distribution goal variable.

Step 182: Determine whether selecting the lowest specified unit rate (spots per period) instead of the lower CPM achieves results that are closer to the spot seeker's goals.

In an embodiment, steps 172-182 are performed in the particular sequence set forth above. In another embodiment, steps 172-182 are performed in a different, suitable sequence.

In an example of yet another embodiment, the procurement system 10 instructs the processor 17 to perform the following steps:

Step 184: Of the inventory of spots, select the spots of the selected markets that satisfy the goal variable 56 of the demographic goal condition 82 (or fall within a designated deviation range of such goal variable), resulting in first filtered or ranked spots.

Step 186: Of the first filtered or ranked spots, select those spots that satisfy the goal variable 56 of the spot frequency goal condition 80 (or fall within a designated deviation range of such goal variable), resulting in second filtered or ranked spots.

Step 188: Calculate and determine the quantity of spots necessary to satisfy the goal variable 56 of the population goal condition 62 (or fall within a designated deviation range of such goal variable).

Step 190: Check whether the quantity of the second filtered or ranked spots is equal to or greater than such population-based quantity.
   (A) If no, indicate a failure outcome, providing the user with the opportunity to select additional markets.
   (B) If yes, proceed to step 302.

Step 192: Check whether the quantity of the second filtered or ranked spots is enough to satisfy the goal variable 56 of the territorial impression goal condition 84 (or fall within a designated deviation range of such goal variable).
   (A) If no, indicate a failure outcome, providing the user with the opportunity to select additional markets.
   (B) If yes, proceed to step 304.

Step 194: Randomly or pseudo-randomly redistribute the second filtered or ranked spots among the selected markets to satisfy the goal variable 56 of the territorial spot distribution goal condition 78 (or fall within a designated deviation range of such goal variable).

Step 196: Check whether the random redistribution of the second filtered spots satisfies the goal variable 56 of the territorial spot distribution goal condition 78 (or falls within a designated deviation range of such goal variable).
   (A) If no, indicate a failure outcome, providing the user with the opportunity to select additional markets.
   (B) If yes, proceed to step 306.

Step 308: calculate and determine the CPM; and

Step 310: check whether the quantity of the determined CPM satisfies the goal variable 56 of the cost goal condition 76 (or falls within a designated deviation range of such goal variable);
   (A) If no, repeat steps 184 through 310.
   (B) If yes, indicate a success outcome and generate one or more buy spot orders or purchase orders.

In an embodiment, steps 184-310 are performed in the particular sequence set forth above. In another embodiment, steps 184-310 are performed in a different, suitable sequence.

In another embodiment, the procurement system 10 instructs the processor 17 to further filter the spots according to the rules 83 and rule variables 57. Referring to FIGS. 5-6 for example, the procurement system 10 instructs the processor 17 to select only those spots that satisfy the rules 83 (having rule variables 57) that are associated with the start date data field 102, air date data field 104, budget goal data field 110, unit data field 112, spot airtime length selector 116, weekend percentage data field 120, time limit control panel 122, program inclusion data fields 126 and program exclusion data field 130.

In an embodiment illustrated in FIG. 10, after the procurement system 10 has filtered the spots and generated the success outcome, the procurement system 10 displays output including a success interface 179. Such output, in an embodiment, includes all of the input files and data illustrated in FIG. 8 in addition to the purchase order data files 183 illustrated in FIG. 10. In an example, the success interface 179 displays a list of the purchase order data files 183 for the different weeks of the applicable advertising project. In the example shown, the procurement system 10 generated purchase order data files 180 for weeks one through ten. Each purchase order data file 183 includes the finally-filtered or selected spots ready to be purchased from the applicable local TV stations 20 (FIG. 1).

In selecting and filtering the spots as described above, the procurement system 10 automatically or semi-automatically analyzes thousands, hundreds of thousands or millions of different spot order scenarios. The procurement system 10 provides a technical improvement by substantially reducing the typical amount of manual labor required for purchasing advertising spots conventionally. Furthermore, the procurement system 10 provides a technical improvement by identifying spot order outcomes that satisfy (or come close to satisfying) the goals of spot seekers 16. Were it not for the procurement system 10, such outcomes would not be readily discoverable. Furthermore, the procurement system 10 aggregates the advertising spot inventory data 18 of multiple independent or local stations 50, 52 resulting in an unwired network. The procurement system 10 uses this unwired network to generate spot orders which, collectively, are distributed across a large territory, such as the United States. Such improvement enables users to generate national orders for independent or local stations that produce some amount of TV programs independent of each other.

Figure 11:
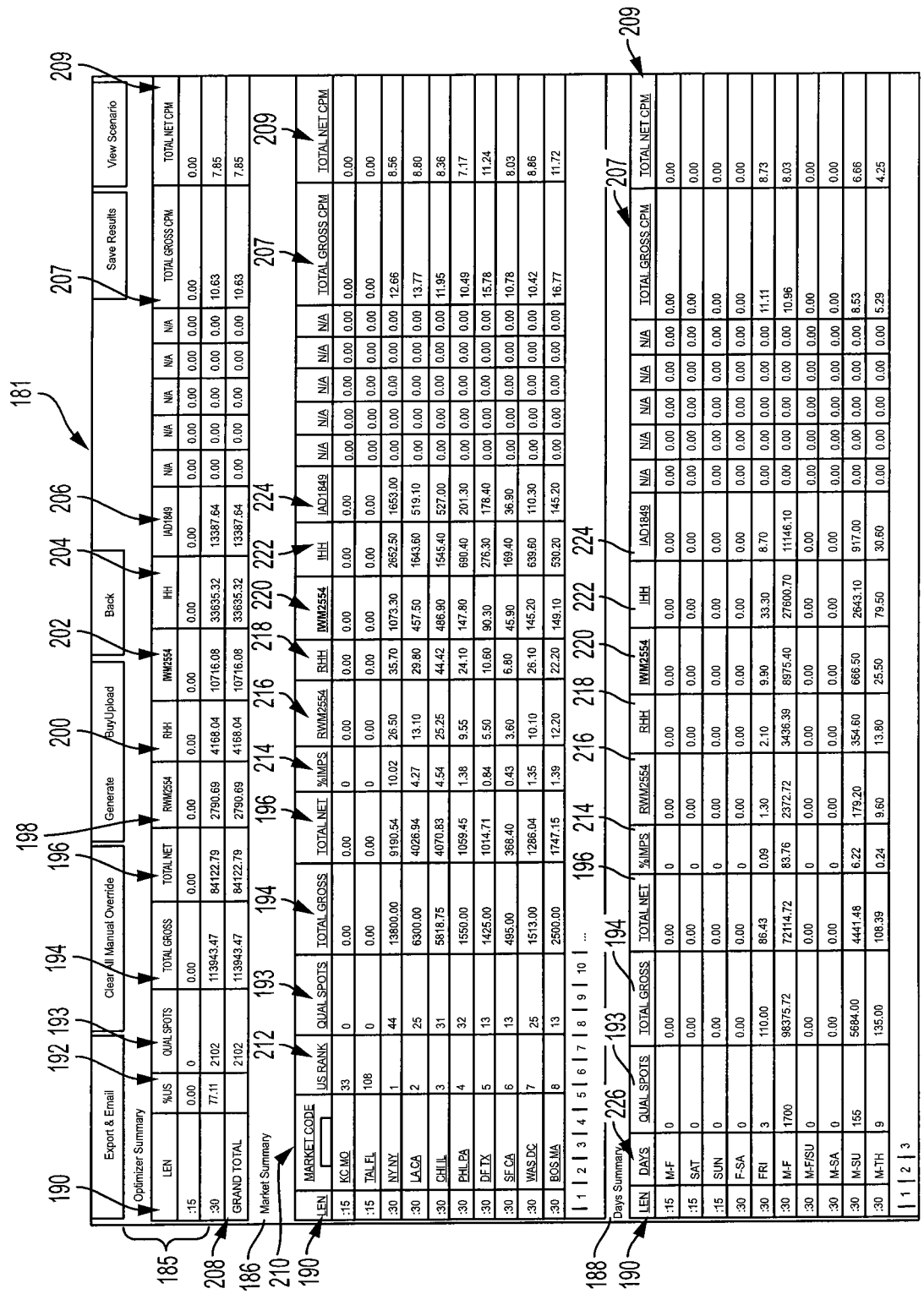
FIG. 11 is top view of an embodiment of an output summary interface of the procurement system.

In an embodiment illustrated in FIG. 11, in response to a user's input, the procurement system 10 displays an output summary interface 181. The output summary interface 181 includes an optimizer section 185, market summary section 186 and days summary section 188. The optimizer section 185 lists: (a) the spot information organized by spot airtime length 190; (b) the percentage of US TV household population 192; (c) the quantity of qualified or selected spots 193; (d) the total gross price 194 for the airing of a commercial in the spots; (e) the total net price 196 payable for the airing a commercial in the spots; (f) the total ratings or impressions earned for each demographic category 198, 200, 202, 204, 206; (g) the total gross CPM 207; and (h) the total NET CPM 209. The optimizer section 185 displays grand totals 208 for such items.

The market summary section 186 lists: (a) the spot information organized by spot airtime length 190; (b) the market code 210; (c) the U.S. rank 212 for the markets; (d) the quantity of qualified or finally-filtered spots 193; (e) the total gross price 194 for the airing of a commercial in the spots; (f) the total net price 196 payable for the airing of a commercial in the spots; (g) the percentage of the total primary demographic impressions 214; (h) the total ratings or impressions earned for each demographic category 216, 218, 220, 222, 224; (i) the total gross CPM 207; and (j) the total NET CPM 209.

The market summary section 186 lists: (a) the spot information organized by spot airtime length 190; (b) the particular days 226 of the week of the airtime for a commercial in the spots; (c) the quantity of qualified or finally-filtered spots 193; (d) the total gross price 194 for the airing of a commercial in the spots; (e) the total net price 196 payable for the airing of a commercial in the spots; (f) the percentage of the total primary demographic impressions 214; (g) the total ratings or impressions earned for each demographic category 216, 218, 220, 222, 224; (h) the total gross CPM 207; and (i) the total NET CPM 209.

Referring back to FIG. 2B, in an embodiment, the procurement method begins with the filter module 59 retrieving spot inventory data 18. The filter module 63 applies rules 83 (including rule variables 57) to filter-out and exclude ineligible spots 217. In doing so, the filter module 63 blocks the formation of spot sets that do not satisfy the applicable requirements, preventing the formation of ineligible spot sets. The spots that meet such requirements pass through the filter module 63, resulting in selectable or eligible spots for forming or generating optimized spot sets 219. As described below, in an embodiment, when the ultra optimization process ends, as illustrated by step 221, the ultra optimizer 14 outputs an ultra-optimized spot set 225.

Figure 12A:
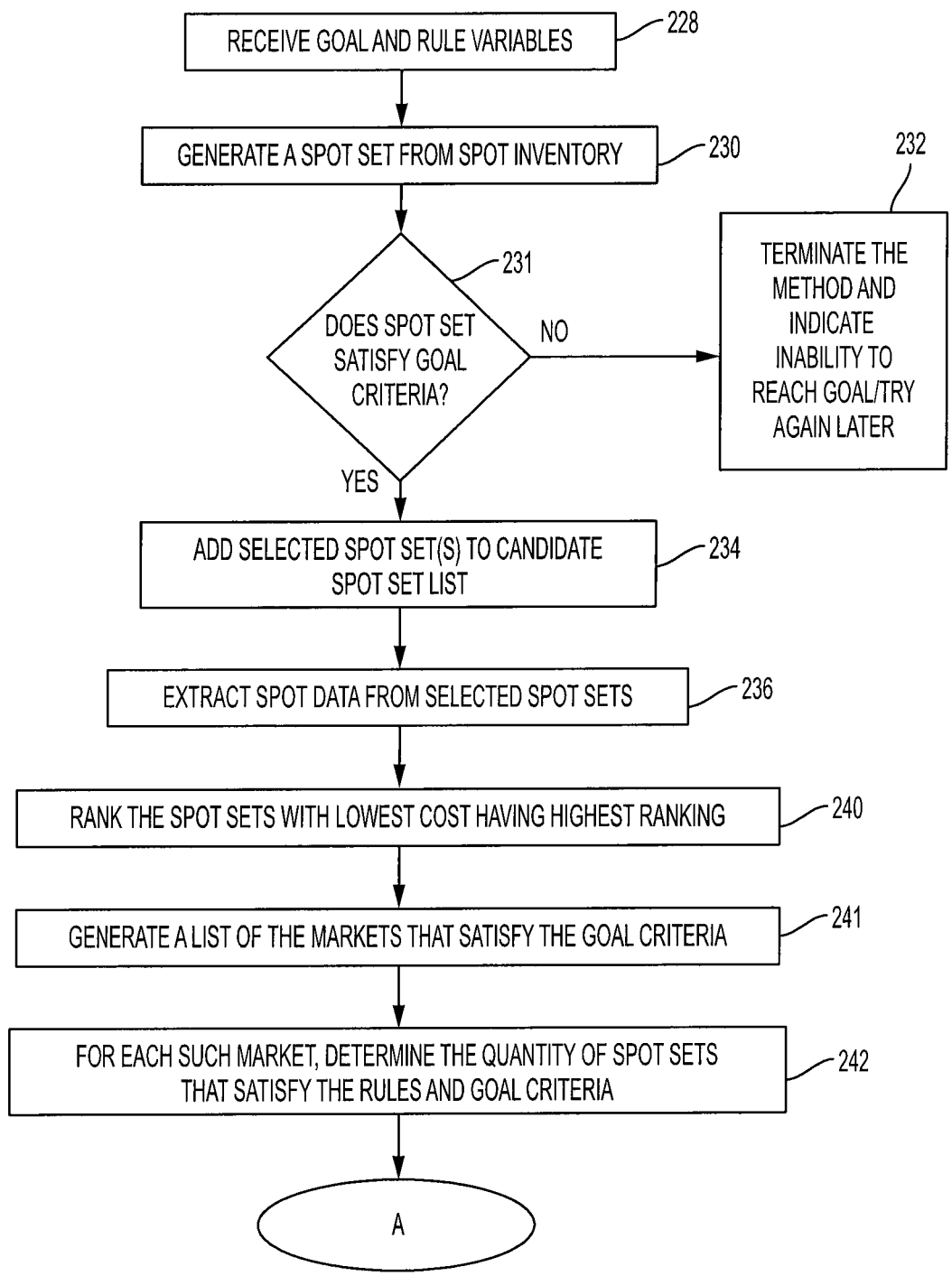
FIG. 12A is a flowchart of an embodiment of part of a base optimization method.
Figure 12B:
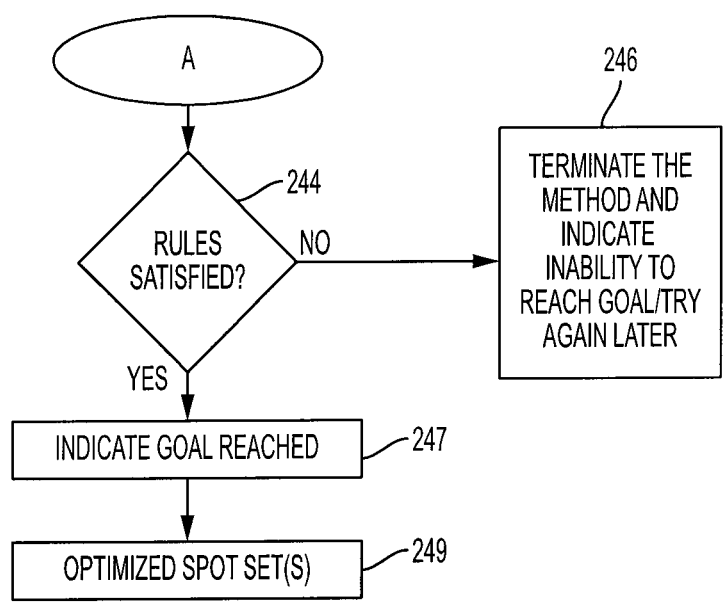
FIG. 12B is the continuation of the flowchart of FIG. 12A, illustrating the remainder of the base optimization method.

In an embodiment of a base optimization method illustrated in FIGS. 12A-12B, the goal module 59 and filter module 63 receive goal variables 56 and rule variables 57, respectively, as illustrated by step 228. The modules 59, 63 retrieve spots to form or generate a spot set from the spot inventory, as illustrated by step 230. As indicated by diamond 231, the base optimizer 12 determines whether the formed spot set satisfies the goals 61 or reaches a designated proximity to the goals 61. If the formed spot set does not meet such goal criteria, the base optimizer 12 terminates the base optimization method and indicates an inability to reach the goals 61, alerting the user to try again later, as illustrated by step 232. If the formed spot set does satisfy such goal criteria, base optimizer 12 adds such spot set to a candidate spot set list, as illustrated by step 234. The base optimizer 12 is operable to repeat steps 231 and 234 to add a plurality of formed spot sets to the candidate spot set list.

Next, as illustrated by step 236, the base optimizer 12 extracts data from the formed spot sets on the candidate spot set list, such as expected impressions, expected cost (e.g., CPM), weekend impressions and market ratio. Then, the base optimizer 12 sorts and ranks the formed spot sets in descending order of CPM (low to high), that is, ranking the formed spot sets with the lowest cost as having the highest ranking, as illustrated by step 238. Next, as illustrated by step 241, the base optimizer 12 selects (or generates a list of) those markets that satisfy the goals 61 or any designated proximity to the goals 61, such as any targeted minimum or targeted maximum amount of spots per market.

As illustrated by step 242 in FIG. 12A, for each one of the selected markets assigned to each of the selected spots sets, the base optimizer 12 determines the minimum quantities of spots that are necessary to satisfy the rules 83, goals 61 and/or any designated proximity to the goals 61, including, but not limited to: (a) a designated minimum allocation with weekend and a designated TV program; (b) a designated minimum allocation with non-weekend and a designated TV program; and/or (c) a designated minimum allocation with non-weekend and no requirement for a designated TV program.

As further illustrated by step 242, for each one of the selected markets assigned to each of the selected spots sets, the base optimizer 12 determines the maximum quantities of spots that are necessary to satisfy the rules 83, goals 61 and/or any designated proximity to the goals 61, including, but not limited to: (a) a designated maximum allocation with weekend and a designated TV program; (b) a designated maximum allocation with non-weekend and a designated TV program; and/or (c) a designated maximum allocation with non-weekend and no requirement for a designated TV program.

In an embodiment, step 242 is repeated up to fifteen times for each of the selected spots sets to increase the quantity of spots to reach the impression goal or a designated proximity to the impression goal. However, once the impression goal or proximity is reached for a formed spot set, the step 242 is repeated only ten times for such spot set.

Next, as illustrated by diamond 244 in FIG. 12B, the base optimizer 12 determines whether the rules 83 are satisfied for each one of the formed spot sets. If the rules 83 are not satisfied for any of the formed spot sets, the base optimizer 12 terminates the base optimization method and indicates the inability to reach the goals, alerting the user to try again later, as indicated by step 246. If the rules 83 are satisfied for any of the formed spot sets, the base optimizer 12 indicates that the goals have been reached (as illustrated by step 247), and the base optimizer 12 outputs a group of optimized spot sets or a single optimized spot set, as illustrated by step 249. The spot seeker 16 can then use the one or more optimized spot sets to launch the desired advertising project. Accordingly, the one or more optimized spot sets resulting from the base optimizer 12 can provide the spot seeker 16 with a valuable, time-saving aid in procuring desirable advertising spots.

In an embodiment, the base optimizer 12 does not generate or form a plurality of spot sets in the process of responding to a single request from the spot seeker 16. For example, instead of compiling a candidate list of spot sets (as indicated by steps 231 and 234), the base optimizer 12 generates or forms a single spot set based on the rules 83, goals 61 and/or any designated proximity to the goals 61. This results in an optimized spot set. The spot seeker 16 can then use this optimized spot set to launch the desired advertising project.

Figure 13:
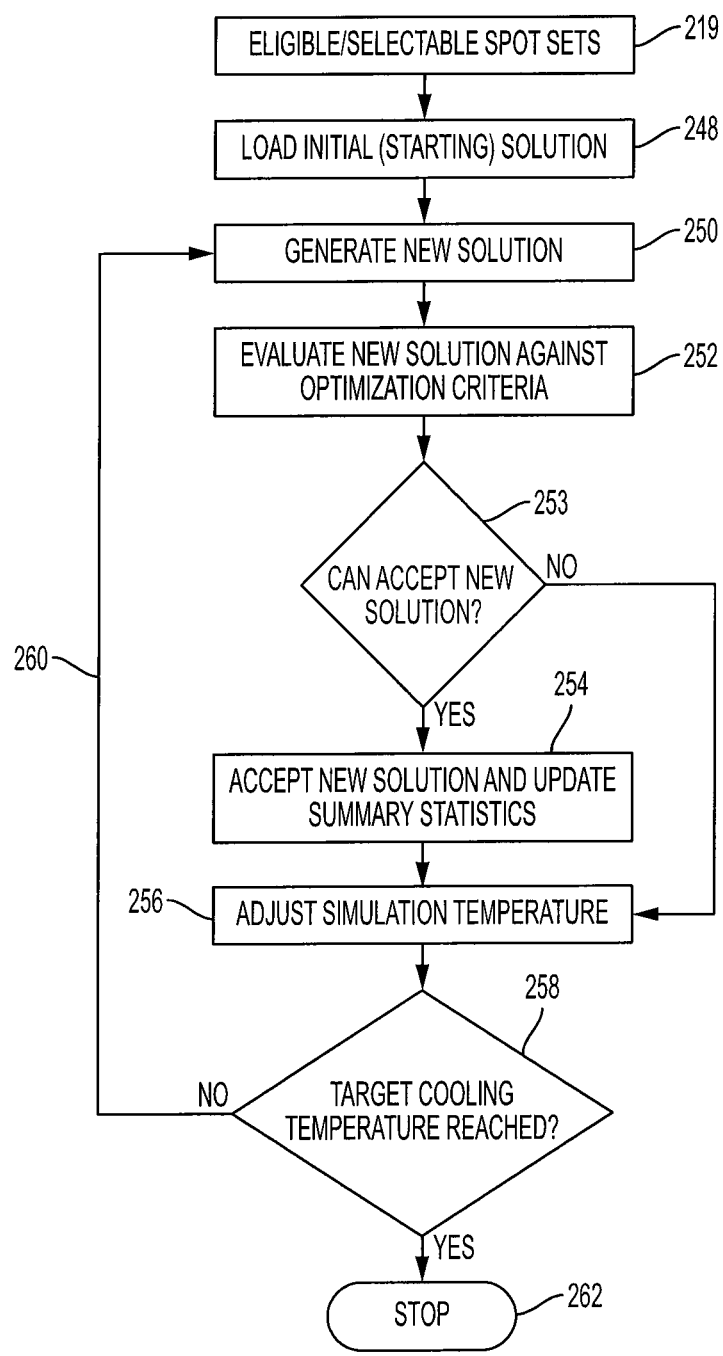
FIG. 13 is a flowchart of an embodiment of the method of operation of an embodiment of the heuristic module.

Referring to FIGS. 2B and 13, in an embodiment, the ultra optimizer 14 provides extra optimization for procuring advertising spots. The ultra optimizer 14 functionally cooperates with the base optimizer 12 to achieve this extra, enhanced or ultra optimization. In an embodiment, the ultra optimizer 14 includes a simulated annealing ("SA") metaheuristic or heuristic module 223. The heuristic module 223 includes an algorithm or set of algorithms having random functionality operable to approximate a global optimum or solution of a given function.

In an embodiment, the SA heuristic module 223 has the logic illustrated in FIG. 13. The SA heuristic module 223 receives one or more eligible or selectable spot sets 219 generated by base optimizer 12, as indicated by step 248. Using one of the selectable spot sets 219 (e.g., S1) as a seed, starting or current solution, the SA heuristic module 223 generates a new solution, such as spot set S2, as illustrated by step 250. The new solution, spot set S2, can include spot set S1 with one or more of its spots removed or replaced with one or more different spots of the selectable spot sets 219.

Next, as illustrated by step 252, the SA heuristic module 223 evaluates the spot set S2 (the new solution) against the rules 83 and goals 61. The SA heuristic module 223 then determines whether to accept the spot set S2, as illustrated by diamond 253. This depends on whether spot set S2 satisfies the rules 83 and also satisfies the goals 61 or has a designated proximity to the goals 61.

If the SA heuristic module 223 accepts the spot set S2, the SA heuristic module 223 updates the summary statistics, as illustrated by step 254, and records or saves spot set S2 as a possible candidate for an ultra-optimized spot set. If the SA heuristic module 223 rejects spot set S2, the SA heuristic module 223 does not record or save spot set S2. In either case, SA heuristic module 223 then adjusts or increments the simulation temperature, as illustrated by step 256.

Next, as illustrated by diamond 258, the SA heuristic module 223 determines whether the target cooling temperature (a coefficient, such as 0.50) has been reached. Until the target cooling temperature is reached, the SA heuristic module 223 continuously and incrementally generates a sequence of new solutions (e.g., spot sets S3, S4, S5, etc.), as indicated by step 260, followed by step 250. When the target cooling temperature is eventually reached, the SA heuristic module 223 stops the ultra optimization method, as illustrated by step 262. This results in an ultra-optimized spot set (e.g., spot set S5).

In an embodiment, the SA heuristic module 223 includes an acceptance probability function P (e, e', T) that specifies the probability of making the transition from the current solution or state S to the new solution or state S'. The probability function P depends on the energies e=E(s) and e'=E(s') of the two states, and it also depends on a global time-varying parameter T referred to as temperature. The temperature T continuously and incrementally decreases over time according to a cooling model. States with a smaller energy are deemed better than those with a greater energy. The probability function P must be positive even when e' is greater than e. This feature or requirement prevents the heuristic method from becoming stuck at a local minimum that is worse than the global one.

When T tends to zero, the probability P (e, e, T) must tend to zero if e'>e and must tend to a positive value otherwise. For sufficiently small values of T, the heuristic method will then increasingly favor moves that go "downhill" (i.e., to lower energy values), and will avoid those that go "uphill." With T=0, this procedure reduces the effect of the greedy algorithm, which makes only the downhill transitions.

In an embodiment, the probability P (e, e, T) is set equal to 1 when e'>e. Accordingly, the procedure always moves downhill when it finds a way to do so, irrespective of the temperature. However, this setting or condition is not essential or necessary for the heuristic method to work.

The P function can be chosen so that the probability of accepting a move decreases when the difference e'−e increases. Accordingly, small uphill moves are more likely than large ones. However, this requirement is not strictly necessary, provided that the requirements described above are met.

Given the foregoing properties, the temperature T plays an important or crucial role in controlling the evolution of the solution or state s with regard to its sensitivity to the variations of system energies. For example, for a large T, the evolution of s is sensitive to coarser energy variations, while the evolution is sensitive to finer energy variations when T is small.

In an embodiment, the SA heuristic module 223 incorporates, implements or embodies one or more or all of the elements, structures, logical steps, concepts, algorithms, formulas, procedures, methods or protocols described in the following publications: (a) Hrcka, L., Vazan, P., Sutova, Z., *Basic overview of simulation optimization*, Research Papers Vol. 22, Faculty of Science and Technology Trnava, Slovakia, 2014; (b) Rutenbar, R. A., *Simulated Annealing Algorithms*, IEEE Circuits and Devices Magazine, January 1989; (c) Coddington, P., *Advantages and Disadvantages of Simulated Annealing*, Northeast parallel architectures center, Syracuse University, Web 2017; and (d) Busetti, F., *Simulated Annealing Overview*, 19 Oct. 2011, Web. http://citeseerx.ist.psu.edu/viewdoc/download?doi=10.1.1.66.5018&rep=rep1&type=pdf. Such publications are hereby incorporated by reference into this detailed description and disclosure.

In an embodiment, the SA heuristic module 223 includes a plurality of statistical factors, settings or coefficients. The coefficients were empirically discovered through rigorous testing and experimentation, including over five hundred trial runs, resulting in the important coefficients set forth in the following Table B:

TABLE B

| | | COEFFICIENTS FOR ULTRA OPTIMIZATION CONTROLS | | | | | |
|---|---|---|---|---|---|---|---|
| MODE | CHARACTERISTIC | INIT TEMP | STOP TEMP | COOLING RATE | WEEKEND CO-EFF | TIME PERIOD CO-EFF | INCLUDE PROGRAM CO-EFF |
| Advanced | Standard advanced optimization (takes the longest time) | 1000 | 0.5 | 0.000006 | 1000 | 1000 | 1000 |
| Quick | Fast pre-optimization, check for potential efficienies (relax rules if necessary) | 1000 | 0.5 | 0.0006 | 1000 | 1000 | 1000 |
| Miner | Data mining for finding better market configurations | 1000 | 0.5 | 0.00001 | 1000 | 100 | 100 |
| Rogue | This setting searches for minimal costs while it may sacrifice some of the programming constraints | 100 | 0.5 | 0.00003 | 0 | 0 | 0 |
| Tradeoff | Tradeoff analytics algorithm to balance speed and granularity of optimization search1 | 10 | 0.5 | 0.00001 | 1000 | 1000 | 1000 |
| Fast10strict | Fast 10 algorithm with strict | 10 | 0.5 | 0.00006 | 1000 | 1000 | 10000 |

TABLE B-continued

COEFFICIENTS FOR ULTRA OPTIMIZATION CONTROLS

| MODE | CHARACTERISTIC | INIT TEMP | STOP TEMP | COOLING RATE | WEEKEND CO-EFF | TIME PERIOD CO-EFF | INCLUDE PROGRAM CO-EFF |
|---|---|---|---|---|---|---|---|
| Fast10 | programming rules adherence Very fast convergence algorithm (for complicated scenarios that take long time) | 10 | 0.5 | 0.00006 | 1000 | 1000 | 1000 |
| Strict | Standard advanced optimization with adherence to strict rules | 1000 | 0.5 | 0.000006 | 1000 | 1000 | 10000 |

As shown above, in an embodiment, the SA heuristic module 223 is operable in a plurality of different modes, including advanced, quick, miner, rogue, tradeoff, fast10strict, fast10 and strict. Each such mode has a different role, effect or characteristic as set forth in Table B. During a setup process for the ultra optimizer 14, the user or spot seeker 16 can select one of the modes in accordance with the user's or spot seeker's preferences.

Through research, it was found that repeatedly generating and evaluating each problem solution can be a very slow process in part because of the numerous variables and options involved with advertising media inventory and scheduling. During the research, the coefficients set forth in Table B were discovered. These coefficients, especially the INIT TEMP, STOP TEMP and COOLING RATE coefficients, reduce or minimize such inefficiency and enable the SA heuristic module 223 to successfully generate optimal results (selection of advertising spot sets) within minutes unlike conventional, prior art systems that require hours of high-end computing time. This efficiency in processing time and efficacy is one of several technical advantages of the SA heuristic module 223.

It should be appreciated that, in an embodiment, it can be mathematically impossible to prove whether an SA method found the most optimal. Rather than spending the time to search for the most optimal solution, the SA heuristic module 223 uses the heuristically-discovered coefficients provided in Table B to find satisfactory, practical, suitable or "good" solutions. Such coefficients lead to a proven technical advantage—the practical result of finding a good or commercially suitable advertising spot set within a relatively short amount of processing time.

In addition, it is known that conventional, prior art SA can be inefficient when only one solution exists. To overcome this drawback, the SA heuristic module 223 includes the different modes set forth in Table B. When the relevant mode is used for the applicable scenario (requirements, goals and preferences of the spot seeker), the SA heuristic module 223 can function quickly, for example, by using market-to-market switching and evaluating lowest spot quantity rates through ranking.

Figure 14A:
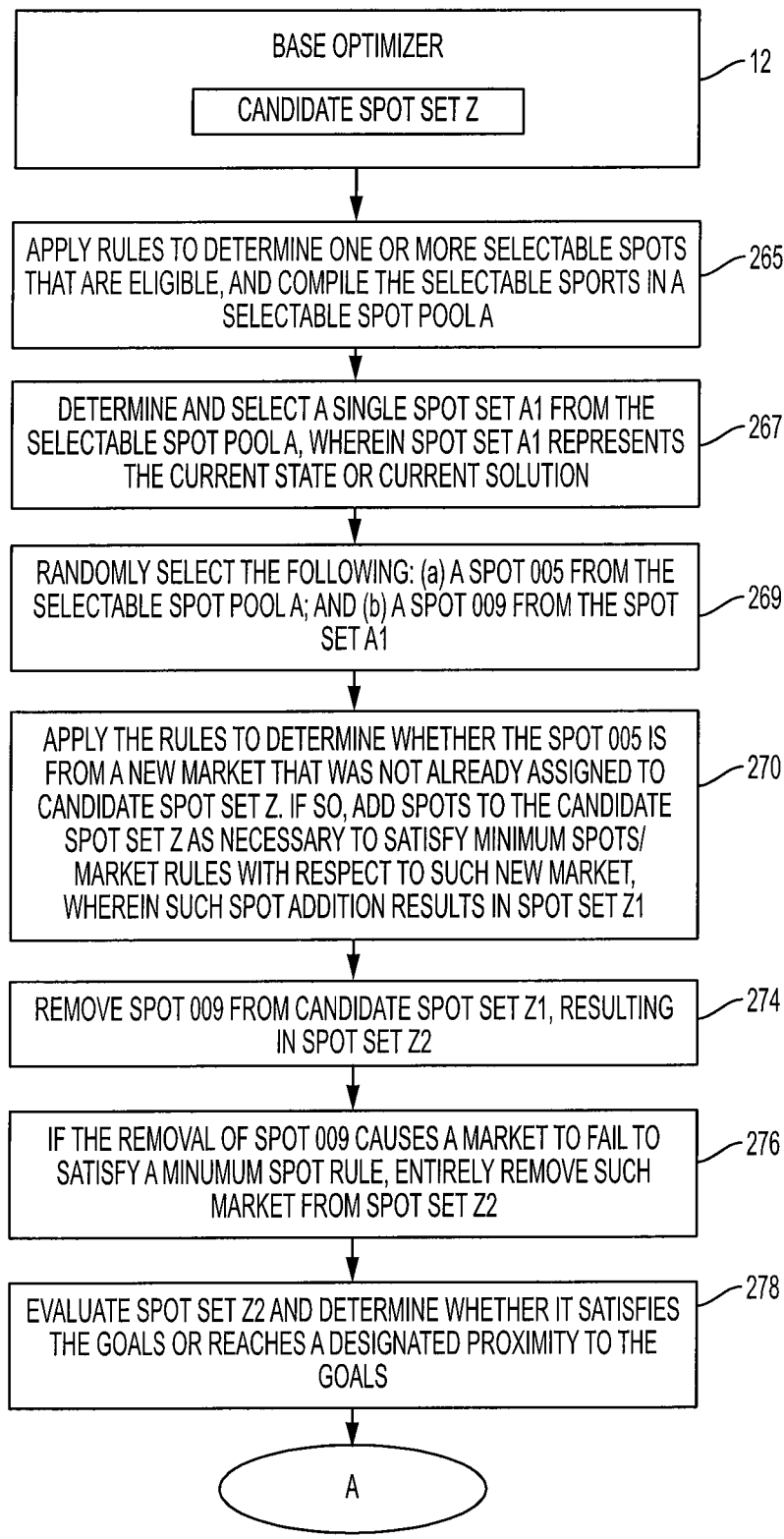
FIG. 14A is a flowchart of an embodiment of part of an ultra optimization method.
Figure 14B:
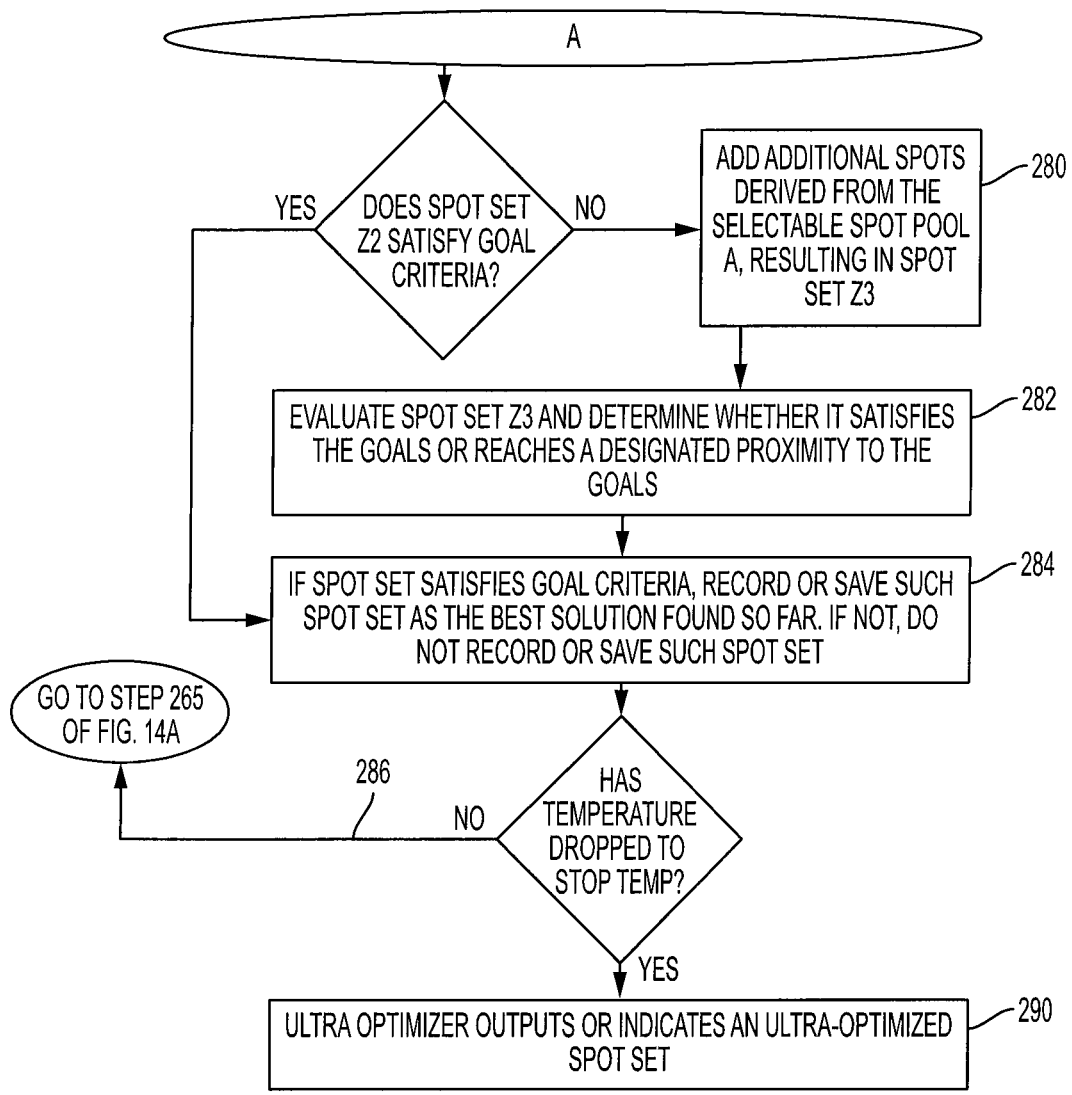
FIG. 14B is the continuation of the flowchart of FIG. 14A, illustrating the remainder of the ultra optimization method.

In an example illustrated in FIG. 14A, the procurement system 10 is operable to perform an ultra optimization method. In this embodiment, the ultra optimizer 14 cooperates with the base optimizer 12 to evaluate a candidate spot set Z that resulted from the preliminary optimization method of the base optimizer 12. First, as illustrated by step 265, the optimizers 12, 14 cooperate to apply the rules 83 to determine one or more selectable spots that are eligible in accordance with the rules 83. In this example, the selectable spots may be compiled in a selectable spot pool A. Then, the optimizers 12, 14 cooperate to determine and select a single spot set A1 from the selectable spot pool A, as illustrated by step 267. Spot set A1 represents the current state or current solution.

As illustrated by step 269, the ultra optimizer 14 randomly selects the following in this example: (a) a spot 005 from the selectable spot pool A; and (b) a spot 009 from the spot set A1.

Next, as illustrated by step 270, the ultra optimizer 14 applies the rules 83 to determine whether the spot 005 is from a new market that was not already assigned to candidate spot set Z. In such event, the ultra optimizer 14 adds spots to the candidate spot set Z as necessary to satisfy minimum spots per market rules with respect to such new market. As a result of such spot addition, the candidate spot set Z changes to candidate spot set Z1, a first variation of candidate spot set Z, also as illustrated by step 270.

Next, as illustrated by step 274, the ultra optimizer 14 removes spot 009 from candidate spot set Z1, resulting in spot set Z2. If the removal of spot 009 causes a market to fail to satisfy a minimum spot rule 83, the ultra optimizer 14 entirely removes such market from spot set Z2, as illustrated by step 276.

The ultra optimizer 14 then evaluates spot set Z2 and determines whether it satisfies the goals 61 or reaches a designated proximity to the goals 61, as illustrated by step 278. The ultra optimizer 14 performs this step in cooperation with the base optimizer 12. For example, spot 005 may be associated with a demographic value of 100, and spot 009 may be associated with a demographic value of 10. These demographic values will affect the satisfaction of, or proximity to, the demographic variables input into the goal module 59 of the base optimizer 12.

If the ultra optimizer 14 determines that spot set Z2 does not satisfy the goals 61 or reach a designated proximity to the goals 61, the base optimizer 12 adds additional spots derived from the selectable spot pool A, as illustrated by step 280. For example, spot set Z2 may fail to satisfy the demographic goal 61 set by the spot seeker 16. The cause of the failure could be the difference between the spot 005's demographic value of 100 and spot 009's demographic value of 10. By adding more spots to spot set Z2, there is a possibility that the demographic goal 61 could be achieved. The addition of spots to spot set Z2 results in spot set Z3.

As illustrated by step 282, the ultra optimizer 14 then evaluates spot set Z3 and determines whether it satisfies the goals 61 or reaches a designated proximity to the goals 61. The ultra optimizer 14 performs this step in cooperation with the base optimizer 12. In performing this step, the ultra optimizer 14 evaluates the attributes of spot set Z3 (e.g., population 62, CPM or cost 64, territorial spot distribution 66, spot frequency 68, demographic 70 and territorial impression level 72 as shown in FIG. 3) using the probabilistic comparison function and current thermodynamic temperature function of the SA heuristic module 223. This step 282 results in an acceptance or rejection of spot set Z3.

If the ultra optimizer 14 accepts spot set Z3 because it satisfies the goals 61 or reaches a designated proximity to the goals 61, the ultra optimizer 14 records or saves spot set Z3 as the best solution found so far, as illustrated by step 284. If the ultra optimizer 14 rejects spot set Z3 because it fails to satisfy the goals 61 or reach a designated proximity to the goals 61, the ultra optimizer 14 does not record or save spot set Z3.

Next, as illustrated by step 286, the ultra optimizer 14 repeats steps 265 to 284 for each incremental decrease in temperature in accordance with the SA heuristic module 223. The incremental decrease starts with the INIT TEMP coefficient for the applicable mode provided in Table B. The ultra optimizer 14 continues this repeat process until the STOP TEMP coefficient is reached for such mode provided in Table B. When the STOP TEMP coefficient is reached, the ultra optimizer 14 outputs or indicates an ultra-optimized spot set, as illustrated by step 290.

In an embodiment, the procurement system 100 can be stored in a database. A processor, such as processor 17, can access such database over any suitable type of network, or the processor can access such database directly if the database and processor are parts of a single server unit. In addition, network access devices operated by users can access such database over any suitable type of network. Depending upon the embodiment, the network can include one or more of the following: a wired network, a wireless network, a local area network (LAN), an extranet, an intranet, a wide area network (WAN) (including, but not limited to, the Internet), a virtual private network (VPN), an interconnected data path across which multiple devices may communicate, a peer-to-peer network, a telephone network, portions of a telecommunications network for sending data through a variety of different communication protocols, a Bluetooth® communication network, a radio frequency (RF) data communication network, an infrared (IR) data communication network, a satellite communication network or a cellular communication network for sending and receiving data through short messaging service (SMS), multimedia messaging service (MMS), hypertext transfer protocol (HTTP), direct data connection, Wireless Application Protocol (WAP), email or any other suitable message transfer service or format.

In an embodiment, processor 17 can include a data processor or a central processing unit (CPU). The procurement system 100 can include one or more data storage devices, including, but not limited to, database 15, a hard drive with a spinning magnetic disk, a Solid-State Drive (SSD), a floppy disk, an optical disk (including, but not limited to, a CD or DVD), a Random Access Memory (RAM) device, a Read-Only Memory (ROM) device (including, but not limited to, programmable read-only memory (PROM), electrically programmable read-only memory (EPROM), electrically erasable programmable read-only memory (EEPROM)), a magnetic card, an optical card, a flash memory device (including, but not limited to, a USB key with non-volatile memory, any type of media suitable for storing electronic instructions or any other suitable type of computer-readable storage medium.

Referring to FIG. 1, the users (including, but not limited to, representatives of local TV stations 20, spot seekers 16 and implementors of the procurement system 10) can use or operate any suitable input/output (I/O) device to transmit inputs to the procurement system 100 and to receive outputs from the procurement system 100, including, but not limited to, a personal computer (PC) (including, but not limited to, a desktop PC, a laptop or a tablet), smart television, Internet-enabled TV, person digital assistant, smartphone, cellular phone or mobile communication device. In one embodiment, such I/O device has at least one input device (including, but not limited to, a touchscreen, a keyboard, a microphone, a sound sensor or a speech recognition device) and at least one output device (including, but not limited to, a speaker, a display screen, a monitor or an LCD).

In an embodiment, the computer-readable instructions, algorithms and logic of the procurement system 100 are implemented with any suitable programming or scripting language, including, but not limited to, C, C++, Java, COBOL, assembler, PERL, Visual Basic, SQL Stored Procedures, Extensible Markup Language (XML), Hadoop, "R," json, mapreduce, python, IBM SPSS, IBM Watson Analytics, IBM Watson and Tradeoff Analytics. The procurement system 100 can be implemented with any suitable combination of data structures, objects, processes, routines or other programming elements.

In an embodiment, the interfaces of the procurement system 100 can be Graphical User Interfaces (GUIs) structured based on a suitable programming language. Each GUI can include, in an embodiment, multiple windows, pull-down menus, buttons, scroll bars, iconic images, wizards, the mouse symbol or pointer, and other suitable graphical elements. In an embodiment, the GUI incorporates multi-media, including, but not limited to, sound, voice, motion video and virtual reality interfaces to generate outputs of the procurement system 100.

In an embodiment, the memory devices and data storage devices described above can be non-transitory mediums that store or participate in providing instructions to a processor for execution. Such non-transitory mediums can take different forms, including, but not limited to, non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transpoting data or instructions, and cables or links transpoting such a carrier wave. Carrier-wave transmission media can take the form of electric or electromagnetic signals, or acoustic or light waves such as those generated during RF and IR data communications.

It should be appreciated that at least some of the subject matter disclosed herein includes or involves a plurality of steps or procedures. In an embodiment, some of the steps or procedures occur automatically as controlled by a processor or electrical controller. In another embodiment, some of the steps or procedures occur manually under the control of a human. In yet another embodiment, some of the steps or procedures occur semi-automatically as partially controlled by a processor or electrical controller and as partially controlled by a human.

As will be appreciated, aspects of the disclosed subject matter may be embodied as a system, method, or computer program product. Accordingly, aspects of the disclosed subject matter may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the disclosed subject matter may take the form of a computer program product embodied in one or more computer readable mediums having computer readable program code embodied thereon.

Aspects of the disclosed subject matter are described herein in terms of steps and functions with reference to flowchart illustrations and block diagrams of methods, apparatuses, systems and computer program products. It should be understood that each such step, function block of the flowchart illustrations and block diagrams, and combinations thereof, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create results and output for implementing the functions described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions described herein.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A method comprising:
    receiving spot inventory data associated with a plurality of TV stations, wherein:
        the TV stations are associated with a plurality of TV programs;
        the TV stations are operable to display the TV programs in first and second markets; and
        the spot inventory data corresponds to a plurality of advertising spots that are selectable to form a plurality of different spot sets that are available for airing at least one commercial during one or more of the TV programs;
    receiving a plurality of variables, wherein the variables comprise:
        at least one rule variable corresponding to at least one advertising rule; and
        at least one goal variable corresponding to at least one advertising goal, wherein the at least one advertising goal comprises a spot distribution goal associated with the first and second markets, wherein the spot distribution goal comprises a mathematical relationship between a first quantity of the advertising spots allocatable to the first market and a second quantity of the advertising spots allocatable to the second market;
    applying the at least one advertising rule to the spot inventory data, resulting in a plurality of eligible advertising spots;
    generating a plurality of eligible spot sets that comprise a plurality of the eligible advertising spots, wherein:
        each of the eligible spot sets satisfies the at least one advertising rule; and
        each of the eligible spot sets either satisfies or deviates from the spot distribution goal;
    modifying at least one of the eligible spot sets that deviates from the spot distribution goal, wherein the modification comprises replacing at least one of the eligible advertising spots in the at least one eligible spot set with a different one of the eligible advertising spots;
    determining a proximity of the modified eligible spot set to the spot distribution goal; and
    identifying the modified eligible spot set depending on the determination of the proximity.

2. The method of claim 1, wherein a plurality of the TV programs are produced independent of each other.

3. The method of claim 1, comprising receiving the variables from a spot seeker, wherein the spot seeker comprises one of a manufacturer, a service provider, or a contractor of the manufacturer or the service provider.

4. The method of claim 1, wherein the at least one advertising rule comprises one of: (a) a requirement corresponding to a day of week, wherein the day of week is specified by the at least one rule variable; (b) a requirement corresponding to a day range, wherein the day range is specified by the at least one rule variable; (c) a requirement corresponding to a time, wherein the time is specified by the at least one rule variable; (d) a requirement corresponding to a spot quantity, wherein the spot quantity is specified by the at least one rule variable; (e) a requirement corresponding to a length of one of the TV programs, wherein the length is specified by the at least one rule variable; or (f) a requirement corresponding to an identification of one of the TV programs, wherein the identification is specified by the at least one rule variable.

5. The method of claim 1, wherein the at least one advertising goal comprises one of:
(a) a goal corresponding to a portion of a population of TV households in a territory comprising the first and second markets, wherein the portion is specified by the at least one goal variable; (b) a goal corresponding to an advertising cost, wherein the advertising cost is specified by the at least one goal variable;
(c) a goal corresponding to a territorial spot distribution, wherein the territorial spot distribution is specified by the mathematical relationship, wherein the mathematical relationship comprises one of: (i) a ratio of the first quantity to the second quantity; (ii) the first and second quantities each being based on an average value; (iii) the first and second quantities each being a result of a spot quantity divided by a market quantity; or (iv) a value of spots per market;
(d) a goal corresponding to a spot frequency, wherein the spot frequency is specified by the at least one goal variable;
(e) a goal corresponding to a demographic, wherein the demographic is specified by the at least one goal variable; or
(f) a goal corresponding to a territorial impression level, wherein the territorial impression level is specified by the at least one goal variable.

6. The method of claim 1, wherein the modifying comprises performing a randomization function.

7. The method of claim 6, wherein the performing of the randomization function comprises performing a heuristic function.

8. The method of claim 7, wherein the performing of the heuristic function comprises performing a simulated annealing function that comprises processing one of: (a) an array of coefficients comprising an initial temperature of 1,000, a stop temperature of 0.50, and a cooling rate of 0.000006; (b) an array of coefficients comprising an initial temperature of 1,000, a stop temperature of 0.50, and a cooling rate of 0.0006; (c) an array of coefficients comprising an initial temperature of 1,000, a stop temperature of 0.50, and a cooling rate of 0.00001; or (d) an array of coefficients comprising an initial temperature of 1,000, a stop temperature of 0.50, and a cooling rate of 0.00003.

9. A system comprising:
a data storage device comprising a plurality of computer-readable instructions that are executable by at least one processor to:
receive spot inventory data associated with a plurality of TV stations, wherein the spot inventory data corresponds to a plurality of advertising spots;
receive a plurality of variables, wherein the variables comprise:
at least one rule variable corresponding to at least one advertising rule; and
at least one goal variable associated with at least one spot distribution goal related to a plurality of markets, wherein the at least one spot distribution goal comprises a relationship between a first quantity of the advertising spots and a second quantity of the advertisings spots, wherein the first quantity is associated with a first one of the markets, and the second quantity is associated with a second one of markets;
apply the at least one advertising rule resulting in a plurality of eligible advertising spots;
generate a plurality of spot sets, wherein each of the spot sets: (a) comprises a plurality of the eligible advertising spots that are available for airing at least one commercial in the first and second markets; and (b) satisfies the at least one advertising rule;
determine whether any of the spot sets fails to satisfy the at least one spot distribution goal;
depending on the determination, replace at least one of the eligible advertising spots in at least one of the spot sets with a different one of the eligible advertising spots, wherein the replacing results in a modified spot set; and
generate an output indicating the modified spot set.

10. The system of claim 9, wherein the a plurality of the computer-readable instructions are executable by the at least one processor to repeat the determining and replacing steps so as to: perform a randomization function applicable to the spot sets.

11. The system of claim 9, wherein:
the modified spot set is available for airing at least one commercial in the first and second markets during a plurality of TV programs associated with the TV stations; and
the output comprises information related to how close the modified spot set is to satisfying the at least one spot distribution goal.

12. The system of claim 9, wherein the data storage device comprises a plurality of computer-readable instructions that are executable by the at least one processor to perform a plurality of steps comprising receiving the variables from a spot seeker, wherein the spot seeker comprises one of a manufacturer, a service provider, or a contractor of the manufacturer or the service provider.

13. The system of claim 9, wherein the at least one advertising rule comprises one of: (a) a requirement corresponding to a day of week, wherein the day of week is specified by the at least one rule variable; (b) a requirement corresponding to a day range, wherein the day range is specified by the at least one rule variable; (c) a requirement corresponding to a time, wherein the time is specified by the at least one rule variable; (d) a requirement corresponding to a spot quantity, wherein the spot quantity is specified by the at least one rule variable; (e) a requirement corresponding to a length of at least one TV program, wherein the length is specified by the at least one rule variable; or (f) a requirement corresponding to an identification of at least one TV program, wherein the identification is specified by the at least one rule variable.

14. The system of claim 9, wherein the at least one spot distribution goal comprises one of: (a) a ratio of the first quantity to the second quantity; (b) the first and second quantities each being based on an average value; (c) the first and second quantities each being a result of a spot quantity divided by a market quantity; or (d) a value of spots per market.

15. The system of claim 10, wherein the randomization function comprises a simulated annealing heuristic function.

16. The system of claim 10, wherein the randomization function comprises a simulated annealing function.

17. The system of claim 16, wherein performing the simulated annealing function comprises processing one of: (a) an array of coefficients comprising an initial temperature of 1,000, a stop temperature of 0.50, and a cooling rate of 0.000006; (b) an array of coefficients comprising an initial temperature of 1,000, a stop temperature of 0.50, and a cooling rate of 0.0006; (c) an array of coefficients comprising an initial temperature of 1,000, a stop temperature of 0.50, and a cooling rate of 0.00001; or (d) an array of coefficients comprising an initial temperature of 1,000, a stop temperature of 0.50, and a cooling rate of 0.00003.

18. A system comprising:
a data storage device comprising a plurality of computer-readable instructions that are executable by at least one processor to:
receive spot inventory data associated with a plurality of TV stations, wherein:
the TV stations are associated with a plurality of TV programs produced independent of each other;
the TV stations are operable to control a performance of the TV programs in a territory; and
the spot inventory data corresponds to a plurality of different advertising spots;
receive at least one rule variable corresponding to at least one advertising rule, wherein the at least one advertising rule comprises a requirement corresponding to at least one day of week, wherein the day of week is specified by the at least one rule variable;
receive at least one goal variable, wherein the at least one goal variable specifies a spot distribution goal associated with a plurality of different markets within the territory, wherein the spot distribution goal comprises a relationship between a first quantity of the advertising spots and a second quantity of the advertising spots, wherein the first quantity is associated with one of the markets, and the second quantity is associated with another one of the markets;
filter the spot inventory data in accordance with the at least one advertising rule, wherein the filtering results in a plurality of eligible advertising spots;
determine at least one of the sets of the eligible advertising spots that fails to satisfy the spot distribution goal;
replace at least one of the eligible advertising spots in the at least one set with a different one of the eligible advertising spots, resulting in a modified set; and
generate a signal that causes an output to indicate the modified set.

19. The system of claim 18, wherein the data storage device comprises a plurality of computer-readable instructions that are executable by the at least one processor to receive a plurality of rule variables corresponding to a plurality of advertising rules, wherein the advertising rules comprise one of: (a) a requirement corresponding to a day of week, wherein the day of week is specified by the at least one rule variable; (b) a requirement corresponding to a day range, wherein the day range is specified by the at least one rule variable; (c) a requirement corresponding to a time, wherein the time is specified by the at least one rule variable; (d) a requirement corresponding to a spot quantity, wherein the spot quantity is specified by the at least one rule variable; (e) a requirement corresponding to a length of one of the TV programs, wherein the length is specified by the at least one rule variable; or (f) a requirement corresponding to an identification of one of the TV programs, wherein the identification is specified by the at least one rule variable.

20. The system of claim 19, wherein the data storage device comprises a plurality of computer-readable instructions that are executable by the at least one processor to receive a plurality of goal variables corresponding to a plurality of advertising goals, wherein the advertising goals comprise one of: (a) a goal corresponding to a portion of a population of TV households in the territory, wherein the portion is specified by the at least one goal variable; (b) a goal corresponding to an advertising cost, wherein the advertising cost is specified by the at least one goal variable; (c) a goal corresponding to a territorial spot distribution, wherein the territorial spot distribution is specified by the relationship; (d) a goal corresponding to a spot frequency, wherein the spot frequency is specified by the at least one goal variable; (e) a goal corresponding to a demographic, wherein the demographic is specified by the at least one goal variable; or (f) a goal corresponding to a territorial impression level, wherein the territorial impression level is specified by the at least one goal variable; and
cause the replacing of the at least one eligible advertising spot to depend, at least in part, on how much the at least one set deviates from the spot distribution goal.

21. A method comprising:
executing a plurality of computer-readable instructions to cause at least one processor to:
receive spot inventory data associated with one or more TV programs that can be aired within first and second markets within a territory, wherein the spot inventory data corresponds to a plurality of advertising spots;
filter the spot inventory data in accordance with at least one rule resulting in a plurality of eligible advertising spots;
generate a plurality of spot sets, wherein each of the spot sets comprises a plurality of the eligible advertising spots;
determine which, if any, of the spot sets deviates from a spot distribution goal, wherein the spot distribution goal specifies a designated relationship between a first quantity of the eligible advertising spots that are allocatable to the first market and a second quantity of the eligible advertising spots that are allocatable to the second market;
depending, at least in part, on the determining, replace at least one of the eligible advertising spots in at least one of the spot sets, resulting in at least one modified spot set; and
cause an output that indicates the at least one modified spot set.

22. The method of claim 21, comprising executing a plurality of the computer-readable instructions to cause the at least one processor to cause the output to:
indicate a plurality of the spot sets that deviate from the spot distribution goal; and
display the spot sets in an order based on how much each of the spot sets deviates from the spot distribution goal.

23. The method of claim 22, comprising executing a plurality of the computer-readable instructions to cause the at least one processor to cause the output to provide information related to how much each of the spot sets deviates from the spot distribution goal.

24. The method of claim 21, comprising executing a plurality of the computer-readable instructions to cause the at least one processor to cause the replacing of the at least one eligible advertising spot to depend, at least in part, on how much the at least one spot set deviates from the spot distribution goal.

25. The method of claim 21, comprising executing a plurality of the computer-readable instructions to cause the at least one processor to:
- determine how much the modified spot set deviates from the spot distribution goal after the replacing of the at least one eligible advertising spot; and
- modify the modified spot set depending, at least in part, on how much the modified spot set deviates from the spot distribution goal, wherein the modifying of the modified spot set comprises replacing at least one of the eligible advertising spots in the modified spot set with a different one of the eligible advertising spots.

* * * * *